United States Patent
Horihata et al.

(10) Patent No.: US 9,160,251 B2
(45) Date of Patent: Oct. 13, 2015

(54) ROTARY ELECTRIC MACHINE FOR RELIABLY DETECTING OFF TIMING OF SWITCHING ELEMENT

(75) Inventors: Harumi Horihata, Nagoya (JP); Hideaki Nakayama, Tokoname (JP)

(73) Assignee: DENSO CORPORATION, Kariya (JP)

( * ) Notice: Subject to any disclaimer, the term of this patent is extended or adjusted under 35 U.S.C. 154(b) by 864 days.

(21) Appl. No.: 13/247,474

(22) Filed: Sep. 28, 2011

(65) Prior Publication Data

US 2012/0081083 A1  Apr. 5, 2012

(30) Foreign Application Priority Data

Sep. 30, 2010 (JP) .................. 2010-221520

(51) Int. Cl.
  *H02K 11/00* (2006.01)
  *H02M 7/538* (2007.01)
  *H02P 9/48* (2006.01)
  *H02M 1/38* (2007.01)
  *H02P 27/08* (2006.01)

(52) U.S. Cl.
  CPC ............. *H02M 7/53803* (2013.01); *H02P 9/48* (2013.01); *H02M 1/38* (2013.01); *H02P 27/08* (2013.01)

(58) Field of Classification Search
  CPC ..... H02M 1/38; H02M 7/53803; H02P 27/08; H02P 9/48
  See application file for complete search history.

(56) References Cited

U.S. PATENT DOCUMENTS

| | | | | |
|---|---|---|---|---|
| 8,564,255 B2* | 10/2013 | Nakayama et al. | ............. | 322/29 |
| 8,570,004 B2* | 10/2013 | Asada et al. | .................... | 322/45 |
| 8,618,776 B2* | 12/2013 | Horihata | ......................... | 322/24 |
| 2008/0225565 A1 | 9/2008 | Tsujimoto et al. | | |
| 2011/0006710 A1* | 1/2011 | Kondo et al. | ............. | 318/400.03 |
| 2011/0156664 A1* | 6/2011 | Horihata | ......................... | 322/24 |
| 2012/0001598 A1* | 1/2012 | Horihata et al. | ................. | 322/21 |

FOREIGN PATENT DOCUMENTS

| | | |
|---|---|---|
| JP | B2-4275704 | 6/2009 |
| JP | A-2010-110176 | 5/2010 |

\* cited by examiner

*Primary Examiner* — Tulsidas C Patel
*Assistant Examiner* — S. Mikailoff
(74) *Attorney, Agent, or Firm* — Oliff PLC

(57) ABSTRACT

In a rotary electric machine, an on-timing setter sets on-timings of each of a high-side switching element and a low-side switching element for each of at least two three-phase stator windings. An off-timing setter sets off-timings of each of the high-side switching element and the low-side switching element. An off-timing fault determiner determines a fault of an off-timing of a target switching element as one of the high-side switching element and the low-side switching element set by the off-timing setter when a time interval from the off-timing of the target switching element set by the off-timing setter to time when a phase voltage corresponding to the target switching element reaches a threshold after the off-timing thereof is shorter than a preset value.

12 Claims, 9 Drawing Sheets

ROTARY ELECTRIC MACHINE FOR RELIABLY DETECTING OFF TIMING OF SWITCHING ELEMENT

CROSS REFERENCE TO RELATED APPLICATIONS

This application is based on Japanese Patent Application 2010-221520 filed on Sep. 30, 2010. This application claims the benefit of priority from the Japanese Patent Application, so that the descriptions of which are all incorporated herein by reference.

TECHNICAL FIELD

The present disclosure relates to a rotary electric machine for generating electrical power and/or moving power, and more particularly, to such a rotary electric machine designed to reliably detect an off timing of at least one switching element for rectifying a phase voltage of one-phase armature winding in multiphase armature windings.

BACKGROUND

There are alternators, which are one type of rotary electric machines, equipped with a power converter for performing, using upper- and lower-arm (high- and low-side) switching elements for multiphase armature windings, synchronous rectification of a phase voltage of one-phase armature winding in the multiphase armature windings, an example of which is disclosed in Japanese Patent Application Publication No. 2010-110176. The power converter of the alternator disclosed in the Patent Publication measures a time "Count" taken from a turnoff of an upper-arm switching element to when a corresponding phase voltage, which exceeded a fourth threshold V4, drops a third threshold V3, thus monitoring an off timing of the upper-arm switching element.

SUMMARY

The inventors have discovered that there is a point that should be improved in the power converter disclosed in the Patent Publication.

Specifically, the power converter disclosed in the Patent Publication can determine whether a turnoff of an upper-arm switching element is normal based on the measured time Count taken from the turnoff of the upper-arm switching element to when a corresponding phase voltage, which exceeded the fourth threshold V4, reduces the third threshold V3.

However, if an off timing of an upper-arm switching element is delayed from the timing when a corresponding phase voltage, which exceeded the fourth threshold V4, reduces the third threshold V3 due to any causes, the corresponding phase voltage may not exceed the fourth threshold voltage V4. This may make it difficult for the power converter disclosed in the Patent Publication to detect whether an off timing of an upper-arm switching element is normal because the corresponding phase voltage does not exceed the fourth threshold voltage V4.

In view of the circumstances set forth above, one aspect of the present disclosure seeks to provide rotary electric machines designed to address the point that should be improved in the power converter disclosed in the Patent Publication.

Specifically, an alternative aspect of the present disclosure aims to provide such rotary electric machines, each of which is equipped with high- and low-side switching elements for at least two three-phase stator windings, improved to reliably detect whether an off timing of a switching element is normal.

According to one aspect of the present disclosure, there is provided a rotary electric machine with a rotatable rotor. The rotary electric machine includes at least two three-phase stator windings; and a rectifying unit including, for each of the at least two-phase stator windings, a pair of a high-side switching element and a low-side switching element and a diode parallely connected to each of the high-side switching element and the low-side switching element. The rectifying unit is configured to rectify a phase voltage induced in each of the at least two-phase stator windings. The rotary electric machine includes an on-timing setter configured to set on-timings of each of the high-side switching element and the low-side switching element; an off-timing setter configured to set off-timings of each of the high-side switching element and the low-side switching element; a switching element driver configured to drive each of the high-side switching element and the low-side switching element according to the on timings and off timing of a corresponding one of the high-side switching element and the low-side switching element instructed by the respective on-timing and off-timing setters; and an off-timing fault determiner configured to determine a fault of an off-timing of a target switching element as one of the high-side switching element and the low-side switching element set by the off-timing setter when a time interval from the off-timing of the target switching element set by the off-timing setter to time when the phase voltage corresponding to the target switching element reaches a threshold after the off-timing thereof is shorter than a preset value.

If an off timing of the target switching element is delayed over a conductive period of the corresponding diode, a surge occurs because of interruption of a current flowing through a corresponding phase winding. The rotary electric machine according to the one aspect of the present disclosure is capable of determining such a phenomenon by detecting that the corresponding phase voltage reaches the threshold immediately after the off timing of the target switching element, in other words, by detecting that the time interval from the off-timing of the target switching element set by the off-timing setter to time when the phase voltage corresponding to the target switching element reaches the threshold after the off-timing thereof is shorter than the preset value. Thus, it is possible to reliably detect off-timing faults of the target switching element.

In a first preferred embodiment of the one aspect, the on-timing setter is configured to set an on-timing of each of the high-side switching element and the low-side switching element every time the phase voltage reaches a first threshold value, and the off-timing fault determiner is configured to use the first threshold value as the threshold, and determine a fault of the off timing of the target switching element as the one of the high-side switching element and the low-side switching element when a first time interval as the time interval from the off-timing of the target switching element set by the off-timing setter to time when the phase voltage reaches the first threshold used to set the on-timing of the other of the high-side switching element and the low-side switching element is shorter than a first preset value as the preset value.

Because the first threshold is used for both determination of off-timing faults of the target switching element and for setting of on-timings of the other of the high-side switching element and the low-side switching element, the structure of comparing the corresponding phase voltage with the first threshold can be shared, making it possible to simplify the structure of the rotary electric machine according to the first preferred embodiment and the operations thereof.

In a second preferred embodiment of the one aspect, the on-timing setter is configured to set an on-timing of each of the high-side switching element and the low-side switching element every time the phase voltage reaches a first threshold value, a time period from an arrival of the phase voltage to the first threshold value to an arrival of the phase voltage to a second threshold value is defined as a conductive period, and the off-timing fault determiner is configured to use the second threshold value as the threshold, and determine a fault of the off timing of the target switching element as the one of the high-side switching element and the low-side switching element when a second time interval as the time interval from the off-timing of the target switching element set by the off-timing setter to time when the phase voltage reaches the second threshold used to detect an end timing of the conductive period of the target switching element is shorter than a second preset value as the preset value. The second preferred embodiment of the one aspect allows an off-timing fault of the target switching element to be reliably detected even before the occurrence of a surge due to the off-timing fault or even if a surge due to the off-timing fault is small in level.

In a third preferred embodiment of the one aspect, the on-timing setter and the off-timing setter are configured to carry out synchronous rectification of the phase voltage induced in each of the at least two three-phase stator windings according to the on-timings and off-timings set by the respective on-timing setter and the off-timing setter. The third preferred embodiment of the one aspect further includes a synchronous-rectification stopper configured to control the on-timing setter and the off-timing setter to stop the synchronous rectification of the phase voltage induced in each of the at least two three-phase stator windings when the off-timing fault determiner determines a fault of the off-timing of the target switching element. Stopping the synchronous rectification of the phase voltage when a fault of the off-timing of the target switching element is detected allows the occurrence of a surge due to the off-timing fault of the target switching element to be prevented. Stopping the synchronous rectification of the phase voltage when the off-timing fault of the target switching element is detected also allows next synchronous control to be started again at normal timing.

In a fourth preferred embodiment of the one aspect, the preset value is determined according to: time from an instruction of the off timing set by the off-timing setter to the switching element driver to timing of actual turn off of the target switching element by the switching element driver; or performance of the switching element driver to actually turn off the target switching element. Moreover, the preset value is determined to contain a point of time when a surge occurs due to non-conductive state of the diode of the target switching element after actual turnoff of the target switching element. This determination of the preset value makes it possible to detect an off-timing fault of the target switching element at a proper time interval depending on the turnoff performance of the switching element driver.

In a fifth preferred embodiment of the one aspect, the preset value is a constant value independently of a rotational speed of the rotatable rotor. Using a constant value as the preset value independently of the rotational speed of the rotor makes it possible to simplify the circuit structure of determining whether there is an off-timing fault of the target switching element.

In a sixth preferred embodiment of the one aspect, the synchronous control stopper is configured to control the on-timing setter and the off-timing setter to stop the synchronous rectification of the phase voltage induced in each of the at least two three-phase stator windings when a rate of variability of an output voltage of the rectifying unit per preset time is higher than a preset value. The sixth preferred embodiment prevents improper setting of on-off timings of each of the high-side and low-side switching elements because it is difficult to properly set on-off timings of a corresponding one of the high-side and low-side switching elements.

A seventh preferred embodiment of the one aspect further includes a load-dump protector configured to: monitor an output voltage at an output terminal of the rectifying unit, the output terminal being connected to a battery; and, when the output voltage exceeds a reference voltage as a reference of occurrence of a surge due to load dump, turn on the low-side switching element for at least one of the at least two three-phase stator windings to perform protection of the rotary electric machine against the load dump. The synchronous control stopper is configured to control the on-timing setter and the off-timing setter to stop the synchronous rectification of the phase voltage induced in each of the at least two three-phase stator windings when the protection by the load-dump protector is started. This seventh preferred embodiment can prevent synchronous rectification during the protection by the load-dump protector being performed.

An eighth preferred embodiment of the one aspect further includes an overheat detector configured to detect overheating in at least one of the high-side switching element and the low-side switching element. The synchronous control stopper is configured to control the on-timing setter and the off-timing setter to stop the synchronous rectification of the phase voltage induced in each of the at least two three-phase stator windings when the overheating in the at least one of the high-side switching element and the low-side switching element is detected by the overheat detector. This eighth preferred embodiment can prevent synchronous rectification during overheating in the at least one of the high-side switching element and the low-side switching element being detected.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
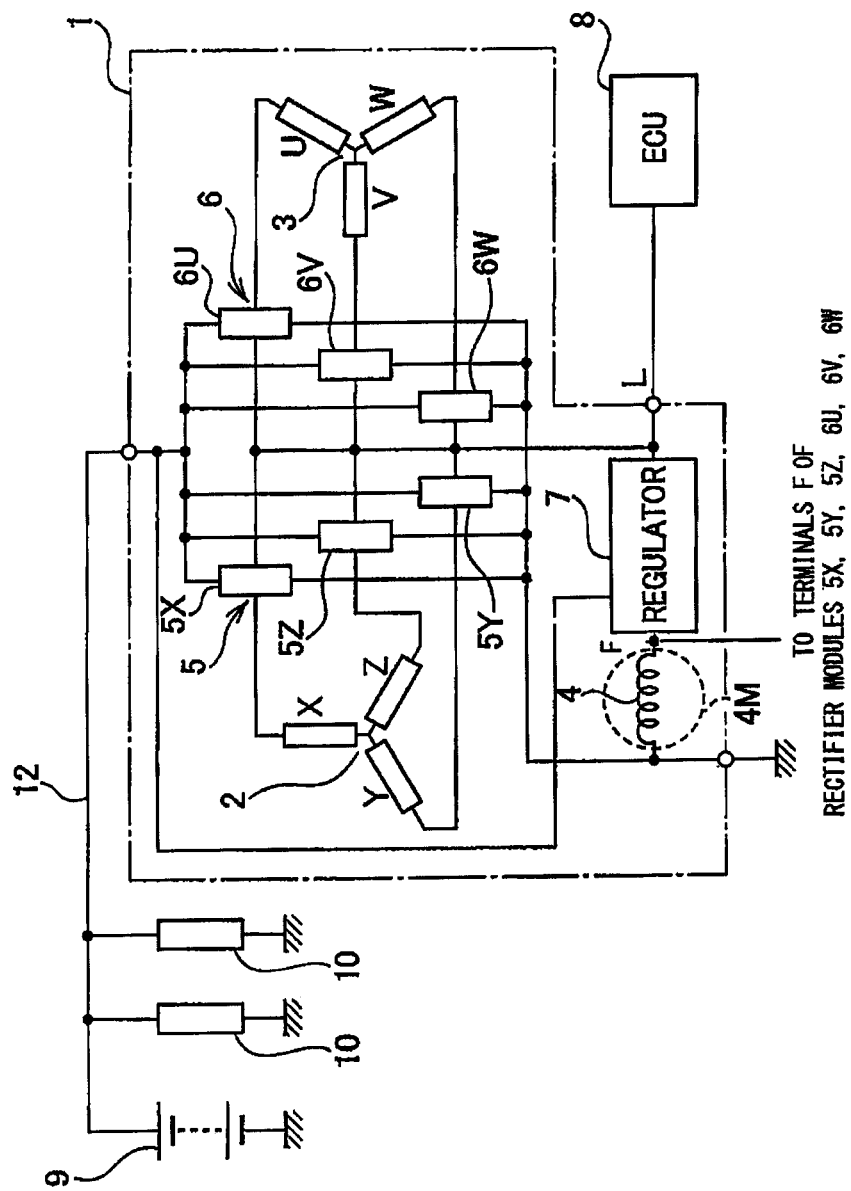
FIG. 1 is a circuit diagram schematically illustrating an example of the system configuration of a rotary electric machine according to an embodiment of the present disclosure.

An embodiment of the present disclosure will be described hereinafter with reference to the accompanying drawings. In the drawings, identical reference characters are utilized to identify identical corresponding components.

Referring to the drawings, particularly to FIG. 1, there is illustrated a rotary electric machine 1 according to this embodiment. In this embodiment, the present disclosure is applied to a three-phase power generator 1 as an example of rotary electric machines installed in a motor vehicle.

The power generator 1 includes first stator (armature) windings 2, second stator (armature) windings 3, a rotor 4M including a field winding 4, a pair of first and second rectifier-modules (module assemblies) 5 and 6, and a voltage regulator (regulator) 7. The first and second rectifier-module assemblies 5 and 6 serve as switching units.

The power generator 1 is operative to convert an alternating-current (AC) voltage induced in each of the first and second stator windings 2 and 3 into a DC voltage via a corresponding one of the first and second rectifier-module assemblies 5 and 6, and supply the DC voltage to a battery 9 via a charge line 12 to charge it therein, and/or the DC voltage to electrical loads 10 installed in the motor vehicle via the charge line 12.

The power generator 1 is also operative to convert a DC voltage supplied from the battery 9 into a three-phase AC voltage via the first and second rectifier-module assemblies 5 and 6, and apply the three-phase AC voltage to each of the first and second stator windings 2 and 3 to thereby generate rotary power (torque) to rotate the rotor 4M. For example, the rotor 4M is directly or indirectly coupled to a crankshaft of an internal combustion engine, referred to simply as an engine, installed in the motor vehicle so that the generated rotary power turns the crankshaft of the internal combustion engine.

The first stator windings 2 are for example multiphase stator windings, such as three-phase stator windings. The first stator windings 2 are wound in and around a cylindrical stator core. For example, the stator core has an annular shape in its lateral cross section, and a plurality of slots formed therethrough and circumferentially arranged at given pitches. The first stator windings 2 are wound in the slots of the stator core.

Similarly, the second stator windings 3 are for example multiphase stator windings, such as three-phase stator windings. The second stator windings 3 are wound in and around, for example, the stator core. For example, the second stator windings 3 are wound in the slots of the armature core such that the first stator windings 2 and the second stator windings 3 have a phase shift of 30 electrical degrees ($\pi/6$ radians) therebetween. The first and second stator windings 2 and 3 and the stator core constitute a stator of the power generator 1.

The first stator windings 2 consist of X-, Y-, and Z-phase windings, which are connected in, for example, a star configuration. The X-, Y-, and Z-phase windings each have one end connected to a common junction (neutral point), and the other end to a separate terminal. Similarly, the second stator windings 3 consist of U-, V-, and W-phase windings, which are connected in, for example, a star configuration. The U-, V-, and W-phase windings each have one end connected to a common junction (neutral point), and the other end to a separate terminal.

The rotor 4M is attached to, for example, a rotary shaft (not shown) and, for example, rotatably disposed within the stator core. One end of the rotary shaft is linked to directly or indirectly to the crankshaft of the internal combustion engine such that the rotor 4M and the rotary shaft are rotatably driven by the internal combustion engine (engine). In other words, rotation of the rotor 4M can be transferred to the crankshaft of the engine as rotary power so that the crankshaft can be rotated by the rotary power.

The rotor 4M includes a plurality of field poles disposed to face the inner periphery of the stator core, and a field winding 4 wound in and around the field poles. The field winding 4 is electrically connected with the regulator 7 via slip rings and the like. When energized by the regulator 7, the field winding 4 magnetizes the field poles with their alternative north and south polarities to thereby generate a rotor magnetic field. Note that, as the rotor 4M, a rotor comprising permanent magnets or a salient-pole rotor for generating a rotating magnetic field can be used. The rotating magnetic field induces an AC voltage in each of the first and second stator windings 2 and 3.

The first rectifier-module assembly 5 is disposed between the first stator windings 2 and the battery 9, and is constructed as a three-phase full-wave rectifier (bridge circuit) as a whole. The first rectifier-module assembly 5 is operative to convert the AC voltage induced in the first stator windings 2 into a DC voltage.

Specifically, the first rectifier-module assembly 5 is comprised of a number of, such as three, rectifier modules 5X, 5Y, and 5Z corresponding to the number of phase of the first stator windings 2. The rectifier module 5X is connected with the X-phase winding in the first stator windings 2, the rectifier module 5Y is connected with the Y-phase winding in the first stator windings 2, and the rectifier module 5Z is connected with the Z-phase winding in the first stator windings.

The second rectifier-module assembly 6 is disposed between the second stator windings 3 and the battery 9, and is constructed as a three-phase full-wave rectifier (bridge circuit) as a whole. The second rectifier-module assembly 6 is operative to convert the AC voltage induced in the second stator windings 3 into a DC voltage.

Specifically, the second rectifier-module assembly 6 is comprised of a number of, such as three, rectifier modules 6U, 6V, and 6Z corresponding to the number of phase of the second stator windings 3. The rectifier module 6U is connected with the U-phase winding in the second stator windings 3, the rectifier module 6V is connected with the V-phase winding in the second stator windings 3, and the rectifier module 6W is connected with the W-phase winding in the second stator windings 3.

The regulator 7 is designed to control a field current to flow through the field winding 4, thus regulating the output voltage of the power generator 1 (an output voltage of each rectifier module) to a target regulated voltage.

The regulator 7 is connected with an Electronic Control Unit (ECU) (external controller) 8 via its communication terminal and communication line. The regulator 7 is operative to carry out serial bidirectional communications, such as LIN (Local Interconnect Network) communications in accordance with LIN protocols, with the ECU 8, thus sending and/or receiving communication messages to and/or from the ECU 8.

The regulator 7 is designed to control a current to be supplied to the field winding 4, thus regulating the output voltage of the power generator 1 (an output voltage of each rectifier module) to a target regulated voltage Vreg whose value is requested by, for example, the ECU 8. For example, if the output voltage of the power generator 1 is higher than the target regulated voltage Vreg, the regulator 7 stops the supply of the current to the field winding 4, and, if the output voltage of the power generator 1 is lower than the target regulated voltage Vreg, the regulator 7 supplies the current to the field winding 4. This regulates the output voltage of the power generator 1 to the target regulated voltage Vreg.

For example, the regulator 7 includes a MOS transistor with a flywheel diode connected thereacross. The drain of the MOS transistor is connected with the output terminal of the power generator 1, and the source is connected with one end of the field winding 4; the other end of the field winding 4 is grounded. The regulator 7 is operative to generate a PWM signal consisting of the train of cyclic pulses, each width (such as each on-period, or each duty cycle) of which is determined depending on the compared result between the output voltage of the power generator 1 is higher than the target regulated voltage Vreg. That is, during the MOS transistor on, a current flows based on the output voltage VB through the field winding 4, and during the MOS transistor off, no current flows through the field winding 4. Thus, the amount (an averaged value) of a field current flowing through the field winding 4 can be adjusted by the duty cycle, and therefore, the output voltage VB is feedback controlled based on the adjusted amount of the field current. The flywheel diode is operative to allow current based on charged energy in the field winding 4 after turnoff of the MOS transistor to be circulated therethrough.

Next, an example of the structure of the rectifier module 5X according to this embodiment will be fully described hereinafter.

Figure 2:
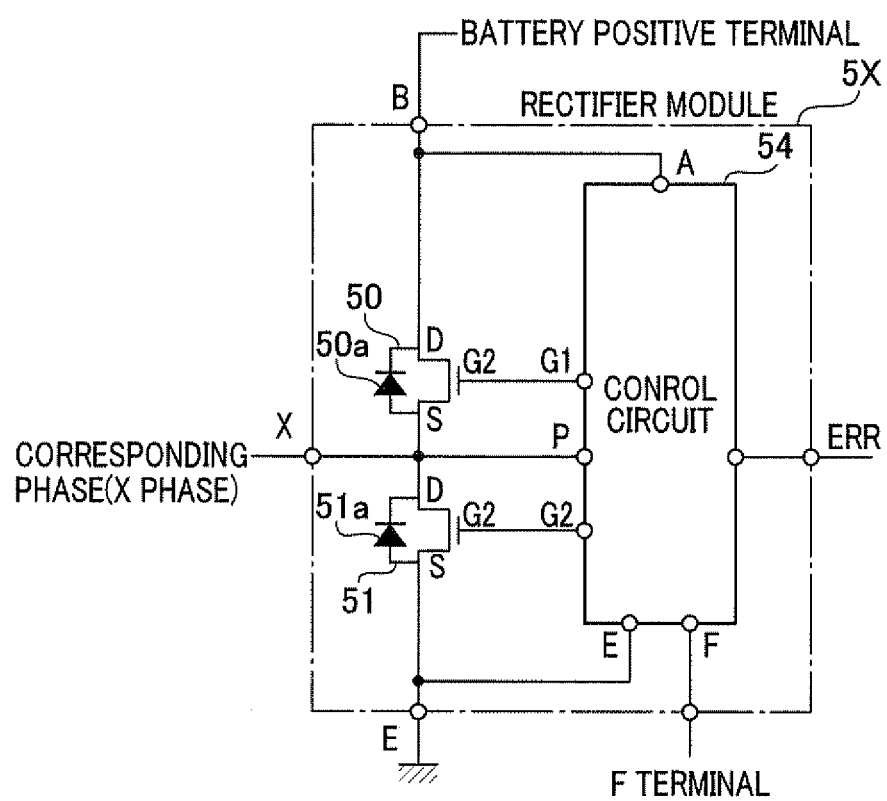
FIG. 2 is a circuit diagram schematically illustrating an example of the structure of a rectifier module illustrated in FIG. 1.

FIG. 2 schematically illustrates the structure of the rectifier module 5X according to this embodiment. Each of the other rectifier modules 5Y, 5Z, 6U, 6Y, and 6Z has the same structure as the rectifier module 5X. Referring to FIG. 2, the rectifier module 5X is comprised of a pair of MOS transistors 50 and 51, and a control circuit 54, and has terminals B, X, E, F, and ERR.

The source S of the MOS transistor 50 is connected with a corresponding phase winding, such as the X-phase winding, of the first stator windings 2 via the terminal X, and the drain D is connected with the positive terminal of the battery 9 and the electric loads 10 via the charge line 12 and the terminal B of the rectifier module 5X. Thus, the MOS transistor 50 serves as a high-side (upper arm) switching element. An intrinsic diode (body diode) 50a is intrinsically provided in the MOS transistor 50 to be connected in parallel thereto. That is, the anode of the intrinsic diode 50a is connected with the source of the MOS transistor 50, and the cathode is connected with the drain thereof.

The drain D of the MOS transistor 51 is connected with a corresponding phase winding, such as the X-phase winding, of the first stator windings 2 via the terminal X and with the source S of the MOS transistor 50. The source S of the MOS transistor 51 is connected with the negative terminal of the battery 9 connected with a signal ground via the terminal E. Thus, the MOS transistor 51 serves as a low-side (lower arm) switching element. An intrinsic diode (body diode) 51a is intrinsically provided in the MOS transistor 51 to be connected in parallel thereto. That is, the anode of the intrinsic diode 51a is connected with the source of the MOS transistor 51, and the cathode is connected with the drain thereof.

In other words, the high- and low-side MOS transistors 50 and 51 are connected with each other in series via a connecting point, and the X-phase winding of the first stator windings 2 is connected with the connecting point between the source S of the MOS transistor 50 and the drain D of the MOS transistor 51.

Note that an additional diode can be connected in parallel to each of the MOS transistors 50 and 51. A switching element with a type different from the MOS transistor type can be used as at least one of the MOS transistors 50 and 51. In this modification, a diode is added to be connected in parallel to the switching element.

Figure 3:
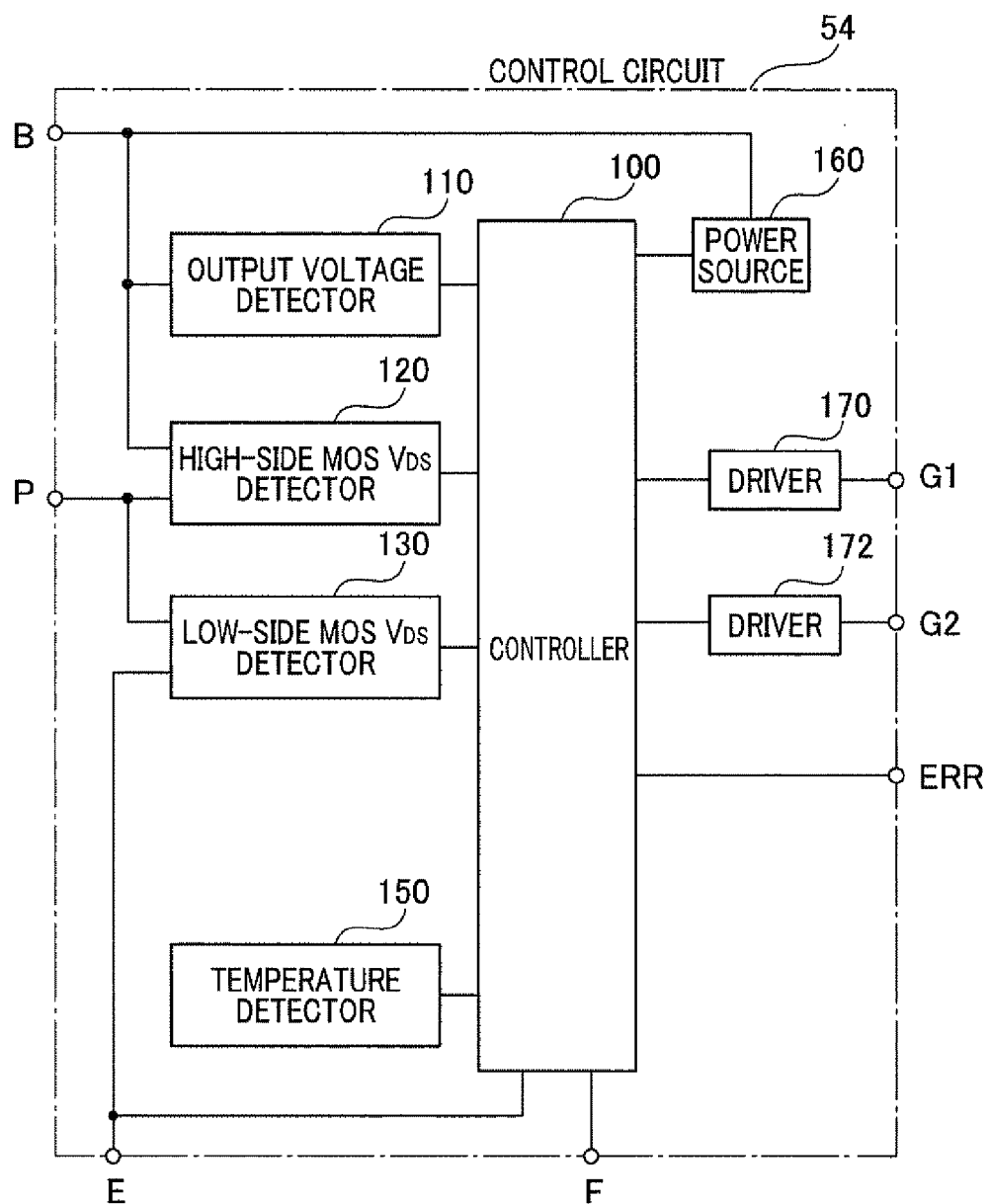
FIG. 3 is a circuit diagram schematically illustrating an example of the structure of a control circuit illustrated in FIG. 2.

FIG. 3 schematically illustrates an example of the structure of the control circuit 54 in detail.

FIG. 3 schematically illustrates an example of the structure of the control circuit 54 in detail. Referring to FIG. 3, the control circuit 54 includes a controller 100, a power source 160, an output voltage detector 110, a high-side MOS $V_{DS}$ detector 120, a low-side MOS $V_{DS}$ detector 130, a temperature detector 150, a driver 170, and a driver 172. The control circuit 54 has, for example, seven terminals B, P, E, F, G1, G2, and ERR. The terminal E is a ground terminal connected via a ground terminal E of the rectifier module 5X with the signal ground. The terminal F is connected with the F terminal of the regulator 7.

The power source 160 is connected with the controller 100 and the terminal B; the terminal B is connected with the terminal B of the rectifier module 5X and the drain D of the MOS transistor 50. For example, the power generator 160 is activated at a timing when a field current is supplied from the regulator 7 to the field winding 4 to supply an operating voltage to each component included in the control circuit 54 based on, for example, the output voltage $V_B$ of the power generator 1. In addition, when the supply of the field current to the field winding 4 is stopped, the power source 160 is deactivated so that the supply of the operating voltage to each component included in the control circuit 54 is stopped. The activation and deactivation of the power source 160 is controlled by the controller 100.

The driver 170 is connected with the controller 100. The driver 170 has an output terminal corresponding to the terminal G1, and the output terminal G1 is connected with the gate G of the high-side MOS transistor 50. The driver 170 is operative to generate a drive signal (voltage signal) to be applied to the gate of the high-side MOS transistor 50 for turning on and off the MOS transistor 50.

The driver 172 is connected with the controller 100. The driver 172 has an output terminal corresponding to the terminal G2, and the output terminal G2 is connected with the gate of the low-side MOS transistor 51. The driver 172 is operative to generate a drive signal (voltage signal) to be applied to the gate of the low-side MOS transistor 51 for turning on and off the MOS transistor 51. For example, the drive signal to be outputted from each of the drivers 171 and 172 is a pulse signal with a controllable duty cycle, that is, the ratio of a controllable pulse width or a controllable on time to a corresponding period (on time+off time).

The output voltage detector 110 is connected with the terminal B and with the controller 100. The output voltage detector 110 is comprised of a differential amplifier 110a and an A/D converter 110b. The input terminals of the differential amplifier 110a are connected with the signal ground and the terminal B. The output terminal of the differential amplifier 110a is connected with the input terminal of the A/D converter 110b. The differential amplifier 110a is operative to output the potential difference between the voltage (output voltage $V_B$) at the positive terminal of the battery 9 connected with the output terminal B of the power generator 1 via the charge line 12 and the ground voltage. That is, the differential amplifier 110a outputs the voltage at the positive terminal of the battery 9 with the voltage little affected from noise as a battery voltage. The A/D converter 110b is operative to convert the output voltage $V_B$ of the power generator 1 into digital data whose value corresponds to the output voltage $V_B$ of the power generator 1, and output, to the controller 100, the digital data. The A/D converter 110b can be provided in the controller 100.

The high-side MOS $V_{DS}$ detector 120 is connected with the terminal P, the terminal B, and the controller 100. The high-side MOS $V_{DS}$ detector 120 is operative to detect the drain-source voltage $V_{DS}$ of the high-side MOS transistor 50, compare the drain-source voltage $V_{DS}$ with a preset threshold, and output, to the controller 100, a voltage signal depending on a result of the comparison.

Figure 4:
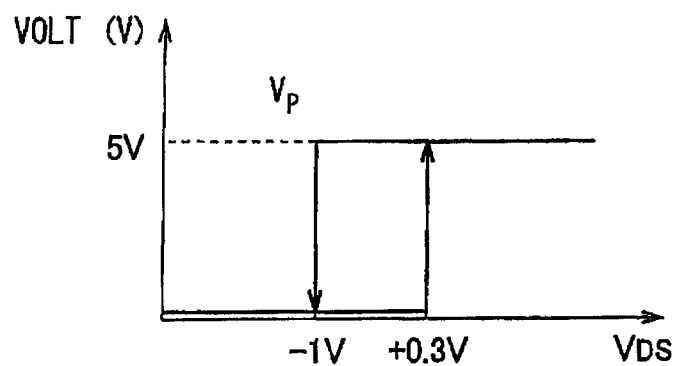
FIG. 4 is a graph schematically illustrating how a high-side MOS $V_{DS}$ detector illustrated in FIG. 3 carries out comparing operations.

FIG. 4 schematically illustrates how the high-side MOS $V_{DS}$ detector 120 carries out comparing operations. In FIG. 4, the horizontal axis represents the drain-source voltage $V_{DS}$ relative to the output voltage $V_B$ and the vertical axis represents the level of a voltage signal to be outputted from the high-side MOS $V_{DS}$ detector 120. Referring to FIG. 4, when a corresponding phase voltage $V_P$ rises to be higher than the output voltage $V_B$ by 0.3 V or more so that the drain-source voltage $V_{DS}$ is equal to or higher than 0.3 V, the high-side MOS $V_{DS}$ detector 120 changes its output signal from a low level (0 V) to a high level (5 V). Thereafter, when the phase voltage $V_P$ becomes lower than the output voltage $V_B$ by 1.0 V or more so that the drain-source voltage $V_{DS}$ is equal to or lower than −1 V, the high-side MOS $V_{DS}$ detector 120 changes its output signal from the high level (5 V) to the low level (0 V).

Voltage V10 higher than the output voltage $V_B$ by 0.3 V (see FIG. 8 described later) represents a first threshold according to this embodiment. The first threshold is to reliably detect the start point of time of a conductive period of the corresponding diode 50a. That is, the first threshold V10 is set to be: higher than the sum of the output voltage $V_B$ and the drain-source voltage $V_{DS}$ of the MOS transistor 50 in on state, and lower than the sum of the output voltage $V_B$ and the forward voltage VF of the diode 50a (see FIG. 8).

Voltage V20 lower than the output voltage $V_B$ by 1.0 V (see FIG. 8) represents a second threshold according to this embodiment. The second threshold is to reliably detect the end point of time of the conductive period of the corresponding diode 50a. That is, the second threshold V20 is set to be lower than the output voltage $V_B$ (see FIG. 8). The period from the arrival of the phase voltage $V_P$ to the first threshold V10 to the arrival of the phase voltage $V_P$ to the second threshold V20 is referred to as an "upper-arm on period". Note that the start point of time and the end point of time of the upper-arm on period are respectively shifted from the start point of time and the end point of time of a conductive period of the diode 50a through which current actually flows during the MOS transistor 50 in off. That is, the power generator 1 according to this embodiment is configured to carry out synchronous rectification of three-phase AC voltages induced in a corresponding one of the first and second stator windings 2 and 3 based on the upper-arm on period.

The low-side MOS $V_{DS}$ detector 130 is connected with the terminal P, the ground terminal E, and the controller 100. The low-side MOS $V_{DS}$ detector 130 is operative to detect the drain-source voltage $V_{DS}$ of the low-side MOS transistor 51, compare the drain-source voltage $V_{DS}$ with a preset threshold, and output, to the controller 100, a voltage signal depending on a result of the comparison.

Figure 5:
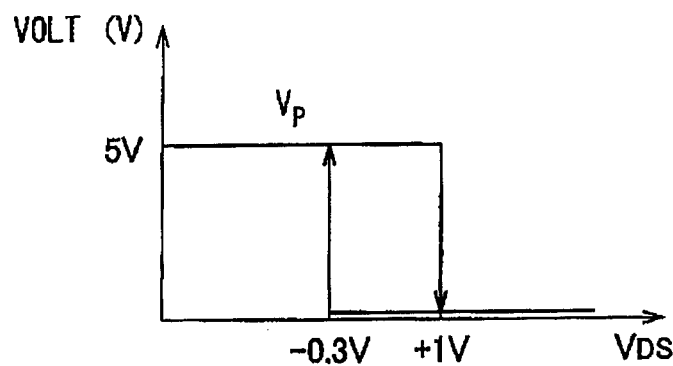
FIG. 5 is a graph schematically illustrating how a low-side MOS $V_{DS}$ detector illustrated in FIG. 3 carries out comparing operations.

FIG. 5 schematically illustrates how the low-side MOS $V_{DS}$ detector 130 carries out comparing operations. In FIG. 5, the horizontal axis represents the drain-source voltage $V_{DS}$ relative to a ground voltage $V_{GND}$ and the vertical axis represents the level of a voltage signal to be outputted from the low-side MOS $V_{DS}$ detector 130. Referring to FIG. 5, when the phase voltage $V_P$ falls to be lower than the ground voltage $V_{GND}$ by 0.3 V or less so that the drain-source voltage $V_{DS}$ is equal to or lower than −0.3 V, the low-side MOS $V_{DS}$ detector 130 changes its output signal from the low level (0 V) to the high level (5 V). Thereafter, when the phase voltage $V_P$ becomes higher than the ground voltage $V_{GND}$ by 1.0 V or more so that the drain-source voltage $V_{DS}$ is equal to or higher than 1.0 V, the low-side MOS $V_{DS}$ detector 130 changes its output signal from the high level (5 V) to the low level (0 V).

Voltage V11 lower than the ground voltage $V_{GND}$ by 0.3 V (see FIG. 8) represents a third threshold according to this embodiment. The third threshold is to reliably detect the start point of time of a conductive period of the corresponding diode 51a. That is, the third threshold V11 is set to be: lower than the subtraction of the drain-source voltage $V_{DS}$ of the MOS transistor 51 in on state from the ground voltage $V_{GND}$ and higher than the subtraction of the forward voltage VF of the diode 51a from the ground voltage $V_{GND}$ (see FIG. 8).

Voltage V21 higher than the ground voltage $V_{GND}$ by 1.0 V (see FIG. 8) represents a fourth threshold according to this embodiment. The fourth threshold is to reliably detect the end point of time of the conductive period of the corresponding diode 51a. That is, the fourth threshold V21 is set to be higher than the ground voltage $V_{GND}$ (see FIG. 8).

The period from the arrival of the phase voltage $V_P$ to the third threshold V11 to the arrival of the phase voltage $V_P$ to the fourth threshold V21 is referred to as a "lower-arm on period". Note that the start point of time and the end point of time of the lower-arm on period are respectively shifted from the start point of time and the end point of time of a conductive period of the diode 51a through which current actually flows during the MOS transistor 51 in off. That is, the power generator 1 according to this embodiment is configured to carry out synchronous rectification of three-phase AC voltages induced in a corresponding one of the first and second stator windings 2 and 3 based on the lower-arm on period.

The temperature detector 150 is connected with the controller 100. The temperature detector 150 is comprised of a pair of diodes provided close to the high- and low-side MOS transistors 50 and 51, respectively. The temperature detector 150 is operative to measure the temperature of each of the MOS transistors 50 and 51 based on the forward voltage of a corresponding one of the diodes, and operative to output a voltage signal with a high level if the temperature of each of the MOS transistors 50 and 51 is equal to or higher than a preset first temperature threshold of, for example, 200° C., and output a voltage signal with a low level if the temperature of each of the MOS transistors 50 and 51 is lower than a preset second threshold of, for example, 170° C.

Figure 6:
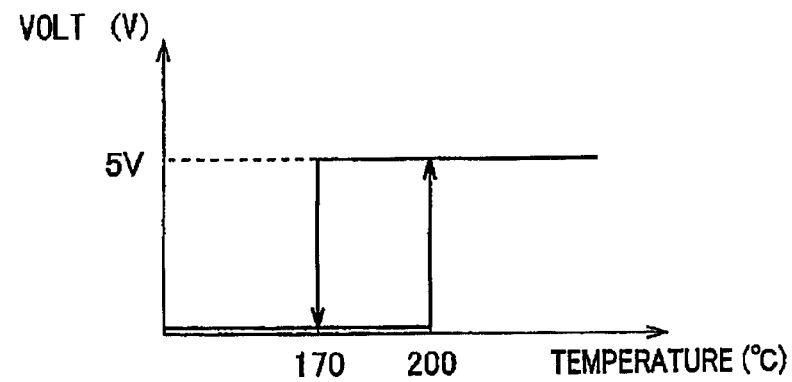
FIG. 6 is a graph schematically illustrating schematic results of temperature detecting operations by a temperature detector illustrated in FIG. 3.

FIG. 6 schematically illustrates schematic results of temperature detecting operations by the temperature detector 150. In FIG. 6, the horizontal axis represents temperature (° C.), and the vertical axis represents the level of a voltage signal to be outputted from the temperature detector 150. Referring to FIG. 6, when the temperature measured by a diode for a MOS transistor 50 or 51 rises to be equal to or higher than the first temperature threshold of 200° C., the temperature detector 150 changes its output signal from the low level (0 V) to the high level (5 V). Thereafter, when the measured temperature falls below the second temperature threshold of 170° C., the temperature detector 150 changes its output signal from the high level (5 V) to the low level (0 V).

The controller 100 is operative to:

determine start and end timings of synchronous rectification;

determine on/off timings of each of the MOS transistors 50 and 51 to carry out synchronous rectification;

drive each of the drivers 170 and 172 according to corresponding on/off timings for a corresponding one of the drivers 170 and 172;

determine shift timings to load-dump protection; and perform the load-dump protection.

Figure 7:
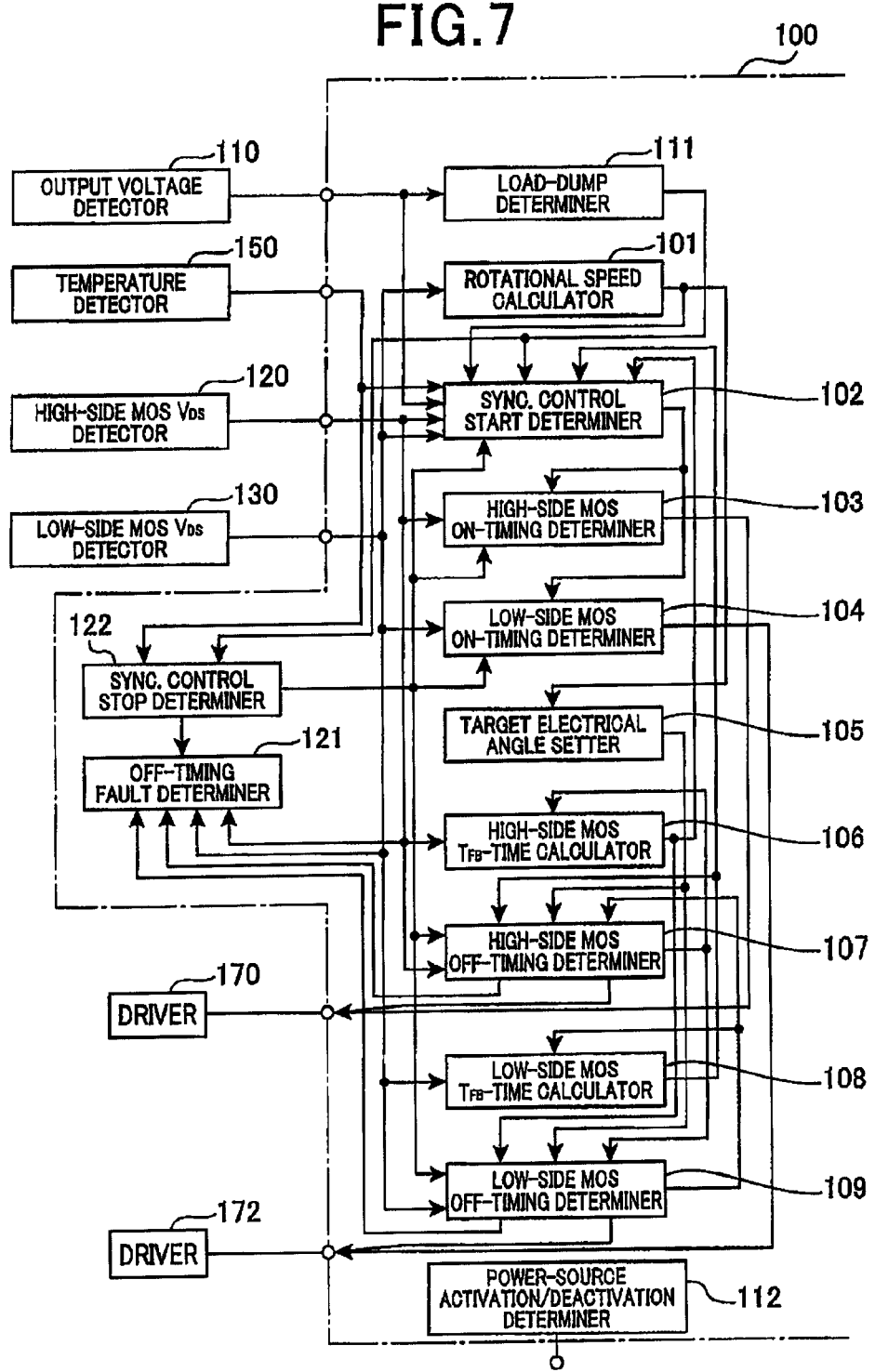
FIG. 7 is a circuit diagram schematically illustrating an example of the detailed structure of a controller illustrated in FIG. 3.

FIG. 7 schematically illustrates an example of the detailed structure of the controller 100. Referring to FIG. 7, the controller 100 functionally includes a rotational speed calculator 101, a synchronous-control start determiner 102, a high-side MOS on-timing determiner 103, a low-side MOS on-timing determiner 104, a target electrical angle setter 105, a high-side MOS $T_{FB}$-time calculator 106, a high-side MOS off-timing determiner 107, a low-side MOS $T_{FB}$-time calculator 108, a low-side MOS off-timing determiner 109, a load-dump determiner 111, a power-source activation/deactivation determiner 112, an off-timing fault determiner 121, and a synchronous control stop determiner 122. For example, the controller 100 can be designed as a microcomputer circuit (programmed logic circuit) comprised of at least a CPU and a memory, and these functional blocks can be implemented by running, by the CPU, at least one program stored in the memory. As another example, the controller 100 can be designed as a hardware circuit comprised of hardware units respectively corresponding to the functional blocks, or as a hardware/software hybrid circuit, some of these functional blocks are implemented by some hardware units, and the remaining functional blocks are implemented by software (at least one program) to be run by the CPU.

For example, the high-side MOS on-timing determiner 103 and low-side MOS on-timing determiner 104 correspond to an on-timing setter, and the target electrical angle setter 105, high-side MOS $T_{FB}$-time calculator 106, high-side MOS off-timing determiner 107, low-side MOS $T_{FB}$-time calculator 108, and low-side MOS off-timing determiner 109 correspond to an off-timing setter. The drivers 170 and 172 correspond to a switching element driver, the load-dump determiner 111 corresponds to a load-dump protector, and the temperature detector 150 corresponds to an overheat protector.

Next, operations of the rectifier module 5X will be described hereinafter.

Power-Source Activation/Deactivation Determination

The power-source activation/deactivation determiner 112 monitors the F terminal of the regulator 7 to determine whether the field current (width-modulated current pulses) for the field winding 4 is continuously supplied from the F terminal to the field winding 4. When determining that the field current is continuously supplied from the F terminal to the field winding 4 for 30 microseconds (μs), the power-source activation/deactivation determiner 112 instructs the power source 160 to activate. On the other hand, when determining that the supply of the field current is interrupted from the F terminal to the field winding 4 for one second, the power-source activation/deactivation determiner 112 instructs the power source 160 to deactivate. In addition, if the output voltage $V_B$ becomes lower than a reference voltage, such as 5 V, which shows low-voltage fault, the power-source activation/deactivation determiner 112 instructs the power source 160 to deactivate.

Thus, the power-source activation/deactivation determiner 112 enables the power source 160 to activate when the field current is supplied to the field winding 4, and disables the power source 160 to deactivate when the supply of the field current is stopped to the field winding 4. This feature makes it possible to activate the components included in the control circuit 54 of the rectifier module 5X only when the power generator 1 outputs power, thus reducing unnecessary power consumption.

Synchronous Control Operations

Figure 8:
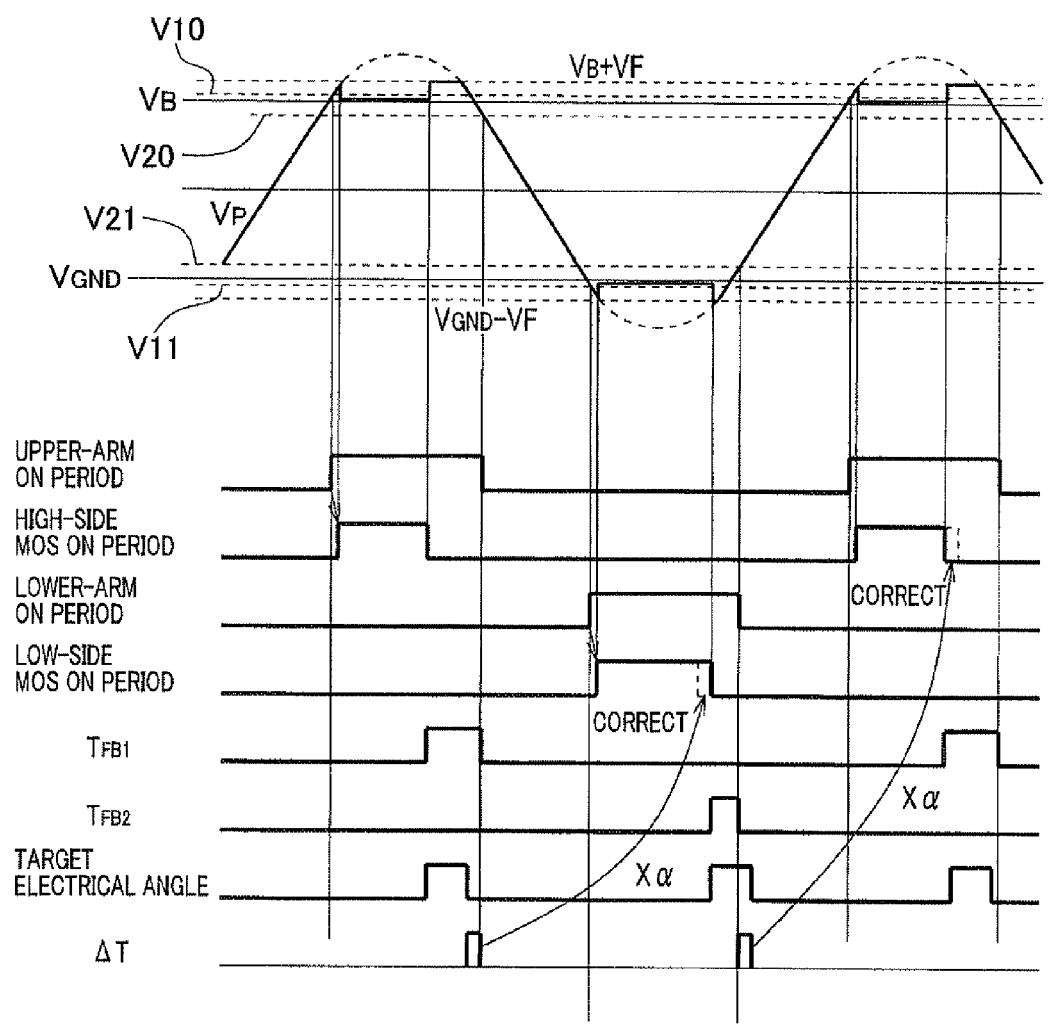
FIG. 8 is a timing chart schematically illustrating operations of the controller in synchronous rectification control mode (synchronous control mode), which corresponds to the rectifying mode according to the embodiment.

FIG. 8 schematically illustrates operations of the controller 100 in synchronous rectification control mode (synchronous control mode). In FIG. 8, the "UPPER-ARM ON PERIOD" represents the output voltage signal from the high-side MOS $V_{DS}$ detector 120, the "HIGH-SIDE MOS ON PERIOD" represents on/off timings of the high-side MOS transistor 50, the "LOWER-ARM ON PERIOD" represents the output voltage signal from the low-side MOS $V_{DS}$ detector 130, and the "LOW-SIDE MOS ON PERIOD" represents on/off timings of the low-side MOS transistor 51. Reference characters $T_{FB1}$, $T_{FB2}$, and ΔT will be described later, and the meaning of the target electrical angle illustrated in FIG. 8 will be described later.

The high-side MOS on-timing determiner 103 monitors the output voltage signal from the high-side MOS $V_{DS}$ detector 120, that is, the upper-arm on period, and determines a rising timing from the low level to the high level in the output voltage signal as an on-timing of the high-side MOS transistor 50, then sending a turn-on instruction to the driver 170. The driver 170 turns on the high-side MOS transistor 50 in response to receiving the turn-on instruction.

The high-side MOS off-timing determiner 107 determines an off timing of the high-side MOS transistor 50 after the lapse of a predetermined time since the turn-on of the high-side MOS transistor 50, and sends a turnoff instruction to the driver 170. The driver 170 turns off the MOS transistor 50 in response to receiving the turnoff instruction.

The predetermined time that determines the off timing is variably set to be earlier by a target electrical angle than the end point of an upper-arm on period, that is, a trailing edge point from the high level to the low level in the output signal from the high-side MOS $V_{DS}$ detector 120 for each turn-on of the high-side MOS transistor 50.

Assuming that diode rectification is carried out through the diode 50a with the MOS transistor 50 permanently off, the target electrical angle serves as a margin that prevents the off timing of the MOS transistor 50 from being delayed from the end point of time of the conductive period of the diode 50a during the diode rectification. The target electrical angle is set by the target electrical angle setter 105. The target electrical angle setter 105 is configured to set the target electrical angle based on the rotational speed of the rotor 4M calculated by the rotational speed calculator 101. The target electrical angle can be constant independently of the rotational speed of the rotor 4M. Preferably, the target electrical angle can be large with the rotational speed of the rotor 4M being within a low-speed range or a high-speed range, and can be small with the rotational speed of the rotor 4M being within an intermediate range between the low-speed range and the high-speed range.

Note that the rotational speed calculator 101 is operative to calculate the rotational speed of the rotor 4M based on: the intervals of rising edges from the low level to the high level in the output signal of the low-side MOS $V_{DS}$ detector 130, or the intervals of falling edges from the high level to the low level in the output signal of the low-side MOS $V_{DS}$ detector 130. Calculation of the rotational speed of the rotor 4M using the output signal of the low-side MOS $V_{DS}$ detector 130 allows stable rotational-speed detection independently of the variations in the output voltage $V_B$ of the power generator 1.

Similarly, the low-side MOS on-timing deter miner 104 monitors the output voltage signal from the low-side MOS $V_{DS}$ detector 130, that is, the lower-arm on period, and determines a rising timing from the low level to the high level in the output voltage signal as an on-timing of the low-side MOS transistor 51, then sending a turn-on instruction to the driver 172. The driver 172 turns on the low-side MOS transistor 51 in response to receiving the turn-on instruction.

The low-side MOS off-timing determiner 109 determines an off timing of the low-side MOS transistor 51 after the lapse of a predetermined time since the turn-on of the low-side MOS transistor 51, and sends a turnoff instruction to the driver 172. The driver 172 turns off the MOS transistor 51 in response to receiving the turnoff instruction.

The predetermined time that determines the off timing is variably set to be earlier by a target electrical angle than the end point of the lower-arm on period, that is, the trailing edge point from the high level to the low level in the output signal from the high-side MOS $V_{DS}$ detector 120 for each turn-on of the low-side MOS transistor 51.

Let us assume that diode rectification is carried out through the diode 51a with the MOS transistor 51 permanently off. In this assumption, the target electrical angle serves as a margin that prevents the off timing of the MOS transistor 51 from being delayed from the end point of time of the conductive period of the diode 51a during the diode rectification. The target electrical angle is set by the target electrical angle setter 105.

Actually, because the end point of a corresponding upper-arm on period is not understood at the turnoff of the actually turn-on high-side MOS transistor 50, the high-side MOS off-timing determiner 107 is configured to determine an off timing of the actually turn-on high-side MOS transistor 50 based on information of the low-side MOS transistor 51 substantially half cycle before the actually turn-on high-side MOS transistor 50, thus enhancing the accuracy of determining an off timing of the actually turn-on high-side MOS transistor 50. Similarly, because the end point of a corresponding lower-arm on period is not understood at the turnoff of the actually turn-on low-side MOS transistor 51, the low-side MOS off-timing determiner 109 is configured to determine an off timing of the actually turn-on low-side MOS transistor 51 based on information of the high-side MOS transistor 50 substantially half cycle before the actually turn-on low-side MOS transistor 51, thus enhancing the accuracy of determining an off timing of the low-side MOS transistor 51.

For example, the high-side MOS off-timing determiner 107 is configured to determine an off timing of the actually turn-on high-side MOS transistor 50 as follows.

Referring to FIG. 8, the low-side MOS $T_{FB}$-time calculator 108 is configured to calculate a time (an electrical angle) $T_{FB2}$ from the turnoff of the low-side MOS transistor 51 substantially half-cycle before the actually turn-on high-side MOS transistor 50 to the end point of time of the corresponding lower-arm on period. The high-side MOS off-timing determiner 107 is configured to subtract the target electrical angle from the electrical angle $T_{FB2}$ to calculate A T. If the rotor 4M is stably turned, the electrical angle $T_{FB2}$ should be identical to the target electrical angle so that the $\Delta$T should be equal to zero. However, many causes may make the $\Delta$T unequal to zero; these causes include: (1) variations of rotation of the rotor 4M due to acceleration and/or deceleration of the vehicle, (2) ripples of rotation of the engine, (3) variations of the electrical loads 10, (4) variations in the clock cycle of the controller 100 if the controller 100 is designed as a programmed logic circuit, and (5) the delay of actual turnoff of each of the MOS transistors 50 and 51 after output of the turnoff instruction from a corresponding driver 170 or 172 to a corresponding MOS transistor 50 or 51.

Thus, the high-side MOS off-timing calculator 107 is configured to correct, by the $\Delta$T, the low-side MOS on period of the low-side MOS transistor 51 used by the low-side MOS off-timing determiner 109 substantially half cycle before the actually turn-on high-side MOS transistor 50 to thereby determine an off timing of the actually turn-on high-side MOS transistor 50. Specifically, the high-side MOS on period is determined in accordance with the following equation:

$$P_{UON} = P_{LON} + \Delta T \times \alpha$$

where $P_{UON}$ represents the high-side MOS on period of the actually turn-on high-side MOS transistor 50, $P_{LON}$ represents the low-side MOS on period of the low-side MOS transistor 51 substantially half cycle before the actually turn-on high-side MOS transistor 50, and $\alpha$ represents a correction factor.

For example, if the electrical angle $T_{FB2}$ is lower than the corresponding target electrical angle so that the $\Delta$T is a negative value, the high-side MOS off-timing determiner 107 determines the high-side MOS on period of the actually turn-on high-side MOS transistor 50 by subtracting the product of the $\Delta$T and the correction factor $\alpha$ from the low-side MOS on period of the low-side MOS transistor 51 substantially half cycle before the actually turn-on high-side MOS transistor 50 (see FIG. 8).

Similarly, the low-side MOS off-timing determiner 109 is configured to determine an off timing of the low-side MOS transistor 51 as follows.

Referring to FIG. 8, the high-side MOS $T_{FB}$-time calculator 106 is configured to calculate a time (an electrical angle) $T_{FB1}$ from the turnoff of the high-side MOS transistor 50 substantially half-cycle before the actually turn-on low-side MOS transistor 51 to the end point of time of the corresponding higher-arm on period. The low-side MOS off-timing determiner 109 is configured to subtract the target electrical angle from the electrical angle $T_{FB1}$ to calculate ΔT.

Thus, the low-side MOS off-timing calculator 109 is configured to correct, by the ΔT, the high-side MOS on period of the high-side MOS transistor 50 used by the high-side MOS off-timing determiner 107 substantially half cycle before the actually turn-on low-side MOS transistor 51 to thereby determine an off timing of the actually turn-on low-side MOS transistor 51. Specifically, the low-side MOS on period is determined in accordance with the following equation:

$$P_{LON1} = P_{UON1} + \Delta T \times \alpha$$

where $P_{LON1}$ represents the low-side MOS on period of the actually turn-on low-side MOS transistor 51, $P_{UON1}$ represents the high-side MOS on period of the high-side MOS transistor 50 substantially half cycle before the actually turn-on low-side MOS transistor 51, and α represents a correction factor.

For example, if the electrical angle $T_{FB1}$ is higher than the corresponding target electrical angle so that the ΔT is a positive value, the low-side MOS off-timing determiner 109 determines the low-side MOS on period of the actually turn-on low-side MOS transistor 51 by adding the product of the ΔT and the correction factor α to the high-side MOS on period of the high-side MOS transistor 50 substantially half cycle before the actually turn-on low-side MOS transistor 51 (see FIG. 8).

As described above, the controller 100 of the rectifying module 5X alternately turns on the high-side MOS transistor 50 within a corresponding upper-arm on period, and on the low-side MOS transistor 51 within a corresponding lower-arm on period to thereby rectify corresponding three-phase AC voltages with low loss.

Determination of Start of Synchronous Control

Next, operations of the controller 100 of the rectifier module 5X to determine whether to shift to the synchronous control mode will be described hereinafter.

The controller 100 of the rectifier module 5X is configured to determine whether to shift to the synchronous control mode immediately after activation of the rectifier module 5X or temporarily stop of the synchronous control due to any causes. That is, the controller 100 of the rectifier module 5X is configured to shift to the synchronous control mode immediately after activation of the rectifier module 5X or temporarily stop of the synchronous control due to any causes only when the following synchronous-control start conditions are met. The synchronous-control start determiner 102 is configured to determine whether the synchronous-control start conditions are met, and send a synchronous-control start instruction to each of the high- and low-side on-timing determiners 103 and 104 when it is determined that the synchronous-control start conditions are met. In response to the synchronous-control start instruction, the high- and low-side on-timing determiners 103 and 104 shift to the synchronous control mode, and operate in the synchronous control mode to alternately turn on the high- and low-side MOS transistors 50 and 51 set forth above.

The synchronous-control stmt conditions include the following first to sixth conditions:

The first condition is that the upper-arm on period and lower-arm on period continuously appear 32 times, in other words, a pair of the upper-arm on period and lower-arm on period continuously appears 16 times assuming that eight pole-pairs (16 field poles) are provided in the rotor 4M. 32 times of appearances of the upper- and lower-arm on periods correspond to mechanically two rotations of the rotor 4M. The first condition can be that the upper-arm on period and lower-arm on period continuously appear 16 times corresponding to one mechanical rotation of the rotor 4M, preset times corresponding to three or more mechanical rotation of the rotor 4M, or preset times except for an integral multiple of one mechanical rotation of the rotor 4M.

The second condition is that the output voltage $V_B$ is within a normal range from 7 V to 18 V, in other words, the output voltage $V_B$ is equal to or higher than 7 V, and equal to or lower than 18 V. The upper and lower limits can be changed. If the power generator 1 is a 24V electrical system, the normal range of the lower and higher limits must be changed.

The third condition is that each of the MOS transistors 50 and 51 is not overheat.

The fourth condition is that the controller 100 of the rectifier module 5X does not operate in the protection mode.

The fifth condition is that the rate of variability in the output voltage $V_B$ per preset time is lower than a threshold, such as 0.5 V per 200 microseconds [μs]. Note that how far the rate of variability in the output voltage $V_B$ is accepted changes depending on elements and/or programs used for the rectifier module 5X. Thus, the threshold can be changed depending on elements and/or programs used for the rectifier module 5X.

The sixth condition is that each of the $T_{FB1}$ and $T_{FB2}$ is longer than an acceptable value of, for example, 15 μs. Note that whether each of the $T_{FB1}$ and $T_{FB2}$ is abnormal is determined based on how much each of the $T_{FB1}$ and $T_{FB2}$ is reduced, and on a cause of the abnormality of a corresponding one of the $T_{FB1}$ and $T_{FB2}$. Thus, the acceptable value can be changed depending on the cause of the abnormality of each of the $T_{FB1}$ and $T_{FB2}$. In addition, in this embodiment, it has been described that the $T_{FB1}$ and $T_{FB2}$ are calculated by the high- and low-side MOS $T_{FB}$-time calculators 106 and 108, respectively, during the synchronous control mode, but they are calculated by the respective high- and low-side MOS $T_{FB}$-time calculators 106 and 108 independently of the operation mode of the controller 100, and used for determination of start of synchronous control.

Figure 9:
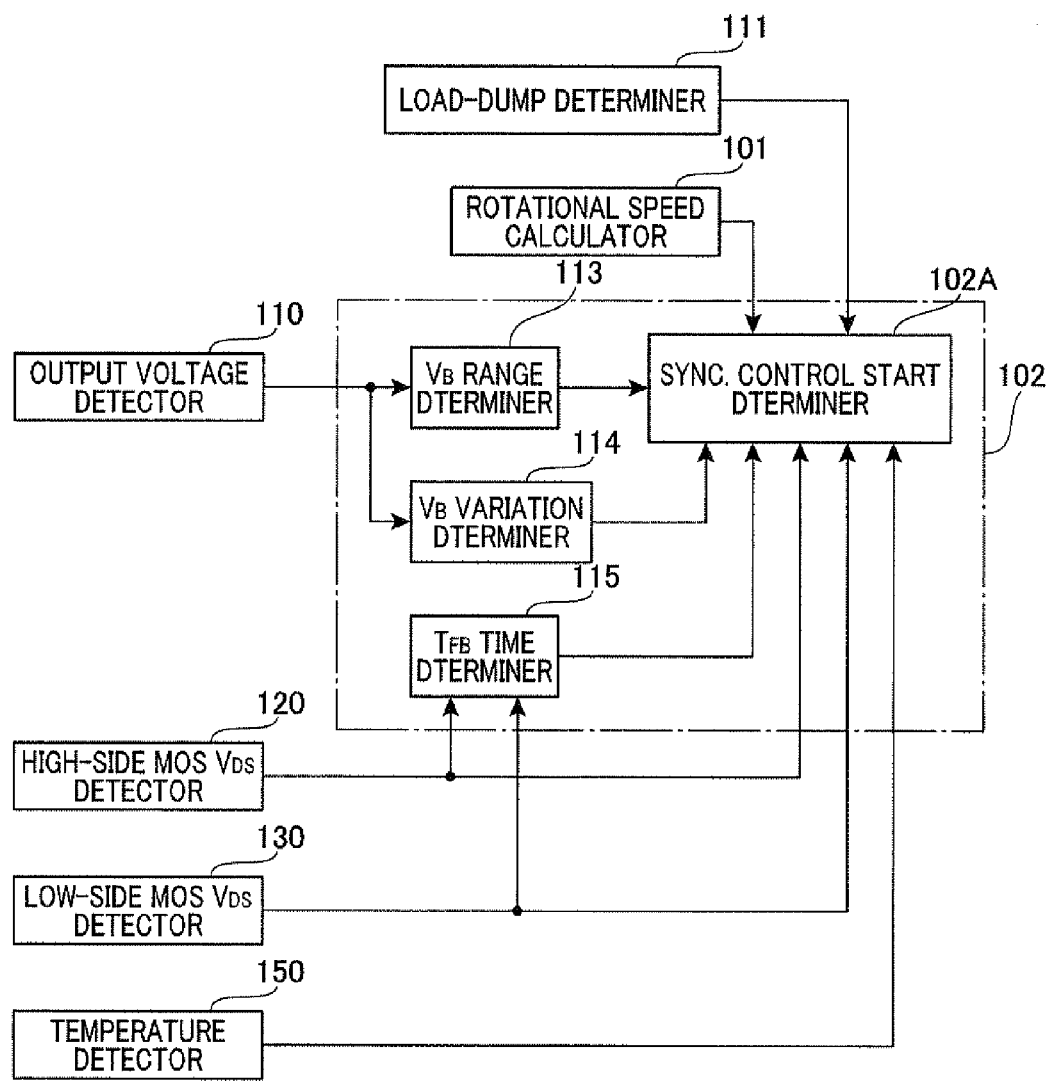
FIG. 9 is a block diagram schematically illustrating some elements in the controller, which are required to determine whether to shift to the synchronous control mode according to the embodiment.

FIG. 9 illustrates some elements in the controller 100, which are required to determine whether to shift to the synchronous control mode.

The synchronous-control start determiner 102 includes a determiner 102A, a V3 range determiner 113, a V3 variation determiner 114, and a $T_{FB}$ time determiner 115.

The load dump deter miner 111 is configured to, if the output voltage $V_B$ exceeds a first threshold V1, such as 20 V, determines that there is load dump due to the disconnection of at least one powered stator winding from the battery 9; this load dump causes a high voltage across the at least one stator winding. Then, the load dump determiner 111 shifts to the protection mode, instructs the driver 170 to turn off the high-side MOS transistor 50, and instructs the driver 172 to turn on the low-side MOS transistor 51 in the protection mode.

Once the output voltage $V_B$ exceeded the first voltage V1 (20 V) due to the occurrence of load dump, if the output voltage $V_B$ is lower than a second threshold V2, which is set to 17 V in this embodiment, the load dump determiner 111 is configured to stop load-dump protection in the protection mode. Note that, in order to prevent the occurrence of a surge due to turn-on or turnoff of each of the high- and low-side MOS transistors 50 and 51, the load dump determiner 111 is configured to start the load dump protection and stop the load dump protection within a lower-arm on period illustrated in FIG. 8.

The load dump determiner 111 is operative to continuously output, in the protection mode, a high level signal (an LD flag with a high level) to the determiner 102A. The load dump determiner 111 is also operative to continuously output, out of the protection mode, a low level signal (the LD flag with a low level) to the determiner 102A. Each of the first and second thresholds V1 and V2 can be set to another value.

The $V_B$ range determiner 113 is configured to determine whether the output voltage $V_B$ detected by the output voltage determiner 110 is within the normal range from 7 V to 18 V. The $V_B$ range determiner 113 is configured to output a low level signal if the output voltage $V_B$ is within the normal range, and output a high level signal if the output voltage $V_B$ is out of the normal range, that is, the output voltage V3 is equal to or lower than 7 V, or equal to or higher than 18 V.

The $V_B$ variation determiner 114 is configured to determine whether the rate of variability in the output voltage $V_B$ detected by the output voltage determiner 110 per preset time is lower than the threshold of 0.5 V per 200 µs. The $V_B$ variation determiner 114 is configured to output a low level signal if the rate of variability in the output voltage $V_B$ is lower than the threshold of 0.5 V per 200 µs, and output a high level signal if the output voltage $V_B$ is equal to or higher than the threshold of 0.5 V per 200 µs.

The $T_{FB}$ time determiner 115 is configured to determine whether each of the $T_{FB1}$ and $T_{FB2}$ calculated by a corresponding one of the high- and low-side MOS $T_{FB}$-time calculators 106 and 108 is longer than the acceptable value of 15 µs. The $T_{FB}$ time determiner 215 is configured to output a low level signal if each of the $T_{FB1}$ and $T_{FB2}$ is longer than the acceptable value of 15 µs, and output a high level signal if none of $T_{FB1}$ and $T_{FB2}$ is equal to or smaller than the acceptable value of 15 µs.

The temperature detector 150 is configured to determine whether each of the MOS transistors 50 and 51 is overheat based on the measured temperature of each of the MOS transistors 50 and 51. If it is determined that at least one of the MOS transistors 50 and 51 is overheat, the temperature detector 150 is configured to carry out overheat protection to set an overheat flag with a high level, and change its output signal from a low level to the high level.

Note that, in FIG. 9, the $V_B$ range determiner 113, the $V_B$ variation determiner 114, and the $T_{FB}$ time determiner 115 are included in the synchronous-control start determiner 102, but they can be provided out of the synchronous-control start determiner 102. In addition, the controller 100 according to this embodiment is configured to shift to the synchronous control mode to start the synchronous control only if all of the first to sixth conditions are met, but the controller 100 can be configured to shift to the synchronous control mode to start the synchronous control only if the first condition and at least one of the second to sixth conditions are met.

Figure 10:
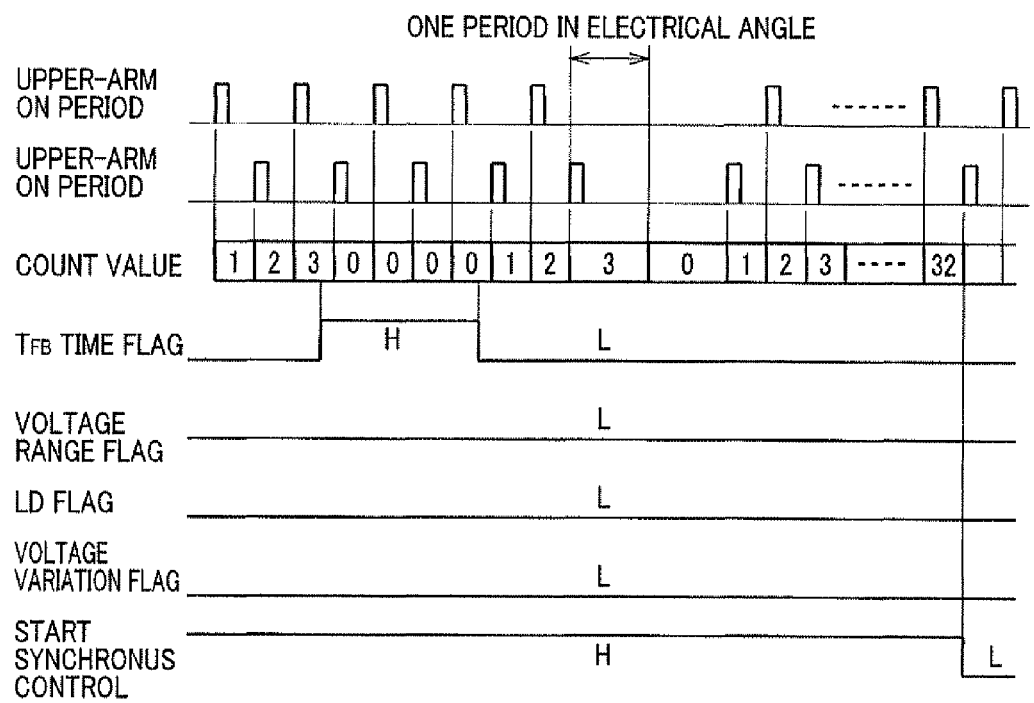
FIG. 10 is a timing chart schematically illustrating operations of the controller to determine whether to start synchronous control (shift to the synchronous control mode) according to the embodiment.

FIG. 10 schematically illustrates operations of the controller 100 to determine whether to start synchronous control (shift to the synchronous control mode). In FIG. 10, the "COUNT VALUE" represents a count value incremented every time the rising timing (edge) of each of upper-arm periods and lower-arm periods appears. In FIG. 10, the "$T_{FB}$ TIME FLAG" represents the output of the $T_{FB}$ time determiner 115, the "VOLTAGE RANGE FLAG" represents the output of the $V_B$ variation determiner 114, and the "LD FLAG" represents the output of the load dump determiner 111. In addition, in FIG. 10, the "OVERHEAT FLAG" represents the output of the temperature detector 150, and the "VOLTAGE VARIATION FLAG" represents the output of the V5 variation determiner 214. In FIG. 10, "H" represents a high level of a corresponding output, and "L" represents a low level of a corresponding output.

The determiner 102A increments a count value with its initial value (0) by 1 every time the rising timing (edge) of each of upper-arm periods and lower-arm periods appears. When the count value reaches "32", the determiner 102A outputs a low level signal indicative of the start of synchronous control to each of the high-side MOS on-timing determiner 103 and the low-side MOS on-timing determiner 104. The high-side MOS on-timing determiner 103 and the low-side MOS on-timing determiner 104 shift to the synchronous control mode in response to receiving the low level signals, and start synchronous control in the synchronous control mode to alternately turn on the MOS transistors 50 and 51.

In addition, the synchronous-control start determiner 102 continues increment of the count value as long as: the interval in electrical angle between the rising edge of an upper-arm on period and the rising edge of a lower-arm on period adjacently before the upper-arm on period is equal to or lower than one cycle of the upper-arm on periods; and all of the outputs (the $T_{FB}$ time flag, the voltage range flag, the LD flag, the overheat flag, and the voltage variation flag) of the respective $T_{FB}$ time determiner 115, the $V_B$ range determiner 113, the load dump determiner 111, the temperature detector 150, and the $V_B$ variation determiner 114 are low levels (L).

In contrast, the synchronous-control start determiner 102 resets the count value if the interval in electrical angle between the rising edge of an upper-arm on period and the rising edge of a lower-arm on period adjacently before the upper-arm on period is higher than the one cycle of the upper-arm on periods and/or any one of the outputs of the respective $T_{FB}$ time determiner 115, the $V_B$ range determiner 113, the load dump determiner 111, the temperature detector 150, and the $V_B$ variation determiner 114 becomes high level (H) before the count value reaches 32 (see "H" of the $T_{FB}$ time flag, and "ONE PERIOD IN ELECTRICAL ANGLE" in FIG. 10).

Thereafter, the synchronous-control start determiner 102 restarts increment of the count value from 0 after: the interval in electrical angle between the rising edge of an upper-arm on period and the rising edge of a lower-arm on period adjacently before the upper-arm on period is equal to or lower than the one cycle of the upper-arm on periods; and all of the outputs of the respective $T_{FB}$ time determiner 115, the $V_B$ range determiner 113, the load dump determiner 111, the temperature detector 150, and the $V_B$ variation determiner 114 are low levels.

Determination of Stop of Synchronous Control

Next, operations of the controller 100 of the rectifier module 5X to determine whether to shift out of the synchronous control mode will be described hereinafter.

The synchronous-control stop determiner 122 is configured to determine whether the synchronous-control stop conditions are met, and send a synchronous-control stop instruction to each of the synchronous-control start determiner 102, the high- and low-side on-timing determiner 103 and 104, the high-side MOS off-timing determiner 107, and the low-side MOS off-timing determiner 109 when it is determined that the synchronous-control stop conditions are met. Thereafter, the synchronous control is stopped until the synchronous-control start determiner 102 restarts synchronous control.

The synchronous-control stop conditions include the following first to fourth conditions:

The first condition is that a time interval from the off timing determined by the low-side MOS off-timing determiner 109 to the arrival of the rising phase voltage $V_P$ to the first threshold V10 used to determine the next on timing of the high-side MOS transistor 50 is shorter than a first preset time interval; this arrival of the rising phase voltage $V_P$ to the first threshold V10 is detected by the high-side MOS $V_{DS}$ detector 120.

The first preset time interval can be set to an interval from the time at which the low-side MOS off-timing determiner 109 actually sends an instruction of the off timing to the driver 172 to the time of actual turnoff of the MOS transistor 51 by the driver 172. More specifically, the first preset time interval can be set based on the turnoff capability of the driver 172 for the MOS transistor 51. The off-timing fault determiner 121 is configured to output a high level signal if the first condition is met, that is, the interval from the off timing determined by the low-side MOS off-timing determiner 109 to the arrival of the rising phase voltage $V_P$ to the first threshold V10 used to determine the next on timing of the high-side MOS transistor 50 is shorter than the first preset time interval. The off-timing fault determiner 121 is configured to output a low level signal if the first condition is not met.

Figure 11:
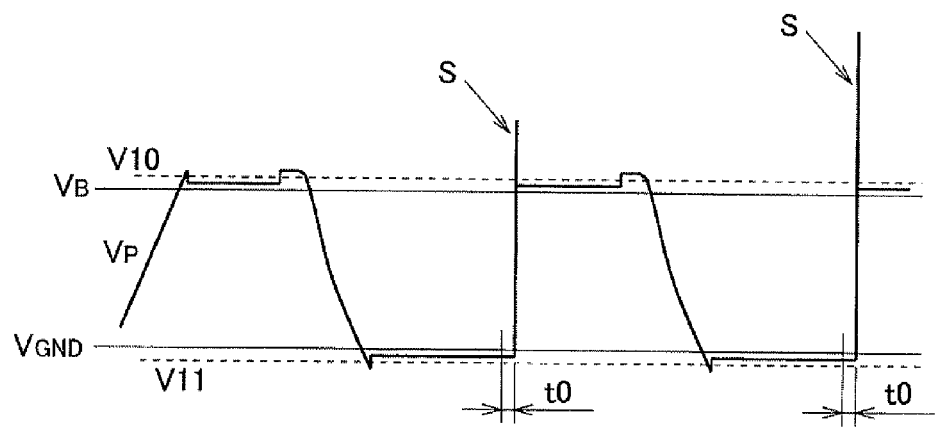
FIG. 11 is a graph schematically illustrating a specific example of the waveform of a phase voltage when an off-timing determined by a low-side MOS off-timing determiner illustrated in FIG. 7 is delayed.

FIG. 11 schematically illustrates a specific example of the waveform of a phase voltage when the off-timing determined by the low-side MOS off-timing determiner 109 is delayed. If the off timing of the MOS transistor 51 is delayed relative to the end timing of the lower-arm on period, a current flowing through the MOS transistor 51 may be interrupted, causing a surge. In FIG. 11, reference character S represents such a surge. The surge may be generated immediately after the turnoff of the MOS transistor 51. When the time interval from the time at which the low-side MOS off-timing determiner 109 actually sends an instruction of the off timing to the driver 172 to the time of actual turnoff of the MOS transistor 51 by the driver 172 is represented as t0 (see FIG. 11), in order to detect the occurrence of a surge due to the delay of the off timing for the MOS transistor 51, the first preset time interval is set to be longer than the time interval t0 by a preset time β after actually sending the instruction of the off timing to the driver 172. The preset time β is set to include the timing of the occurrence of a surge due to the delay of the off timing for the MOS transistor 51, and need be shorter than a time required for the phase voltage $V_P$ to rise up to the first threshold V10 during normal synchronous control being carried out without the occurrence of off-timing faults.

The second condition is that a time interval from the off timing determined by the high-side MOS off-timing determiner 107 to the arrival of the falling phase voltage $V_P$ to the third threshold voltage V11 used to determine the next on timing of the low-side MOS transistor 51 is shorter than a second preset time interval; this arrival of the falling phase voltage $V_P$ to the third threshold V11 is detected by the low-side MOS $V_{DS}$ detector 130.

The second preset time interval can be set to an interval from the time at which the high-side MOS off-timing determiner 107 actually sends an instruction of the off timing to the driver 170 to the time of actual turnoff of the MOS transistor 50 by the driver 170. More specifically, the second preset time interval can be set based on the turnoff capability of the driver 170 for the MOS transistor 50. The off-timing fault determiner 121 is configured to output a high level signal if the second condition is met, that is, the interval from the off timing determined by the high-side MOS off-timing determiner 107 to the arrival of the falling phase voltage $V_P$ to the third threshold voltage V11 used to determine the next on timing of the low-side MOS transistor 51 is shorter than the second preset time interval. The off-timing fault determiner 121 is configured to output a low level signal if the second condition is not met.

Note that the first and second preset time intervals can be identical to each other, or different from each other. It is preferable that each of the first and second preset time intervals is a constant value independently of the rotational speed of the rotor 4M because it is set based on the turnoff performance of a corresponding one of the drivers 170 and 172.

The third condition is that the rate of variability in the output voltage $V_B$ per preset time is higher than the threshold, such as 0.5 V per 200 μs. Note that how far the rate of variability in the output voltage $V_B$ is accepted changes depending on elements and/or programs used for the rectifier module 5X. Thus, the threshold can be changed depending on elements and/or programs used for the rectifier module 5X.

Figure 12:
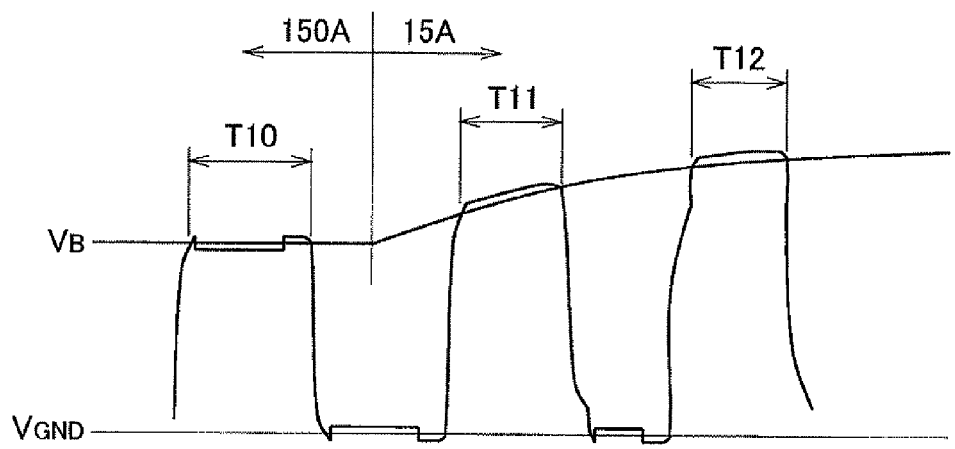
FIG. 12 is a graph schematically illustrating a relationship between the variation in the output voltage and upper- and lower-arm on periods according to the embodiment.

FIG. 12 schematically illustrates a relationship between the variation in the output voltage $V_B$ and upper- and lower-arm on periods.

For example, if the output current drops suddenly from 150 A to 15 A, the output voltage $V_B$ rises (see FIG. 12). Then, upper-arm on periods T11 and T12 after the change in the output of the power generator 1 are reduced as compared with an upper-arm on period T10 before the change in the output of the power generator 1. This similarly appears for lower-arm on periods (see FIG. 12).

As described above, when the upper-arm on period or the lower-arm on period varies to be reduced, an off timing normally determined for at least one of the high- and low-side MOS transistors 50 and 51 set forth above may be delayed relative to a corresponding upper- or lower-arm on period. Thus, the threshold, such as 0.5 V per 200 μs, is used to avoid such a delay. As described above, the threshold for the determination of stop of synchronous control can be identical to that for the determination of start of synchronous control, or different therefrom.

The fourth condition is that the controller 100 of the rectifier module 5X operates in the protection mode.

The fifth condition is that at least one of the MOS transistors 50 and 51 is overheat.

Figure 13:
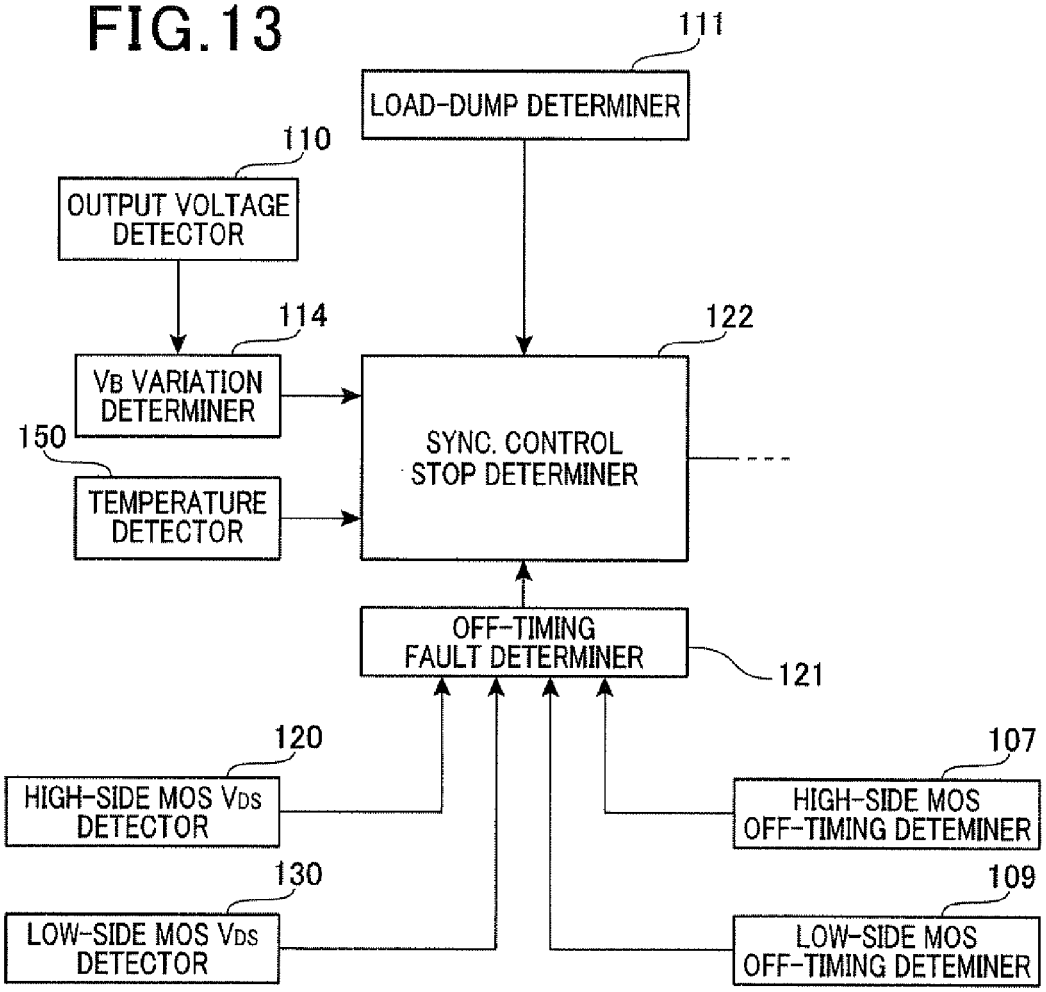
FIG. 13 is a block diagram schematically illustrating some elements in the controller, which are required to determine whether to shift out of the synchronous control mode according to the embodiment.

FIG. 13 illustrates some elements in the controller 100, which are required to determine whether to shift out of the synchronous control mode. The $V_B$ variation determiner 114 of the synchronous-control start determiner 102 is used for determination of stop of synchronous control.

Referring to FIG. 13, to the synchronous-control stop determiner 122, the output of each of the off-timing fault determiner 121, the $V_B$ variation determiner 114, the load dump determiner 111, and the temperature detector 150 is inputted.

From the off-timing fault determiner 121, the high level signal is inputted to the synchronous-control stop determiner 122 as long as the first condition or second condition in the synchronous-control stop conditions is met. From the $V_B$ variation determiner 114, the high level signal is inputted to the synchronous-control stop determiner 122 as long as the rate of variability in the output voltage $V_B$ per preset time is higher than the threshold of 0.5 V per 200 μs so that the third condition in the synchronous-control stop conditions is satisfied.

In addition, from the load dump determiner 111, the high level signal is inputted to the synchronous-control stop determiner 122 as long as the controller 100 of the rectifier module 5X operates in the protection mode so that the fourth condition is met with the LD flag with the high level being set. From the temperature detector 150, the high level signal is inputted to the synchronous-control stop determiner 122 as long as the fifth condition is met, that is, the overheat flag with the high level is set due to at least one of the MOS transistors 50 and 51 being determined to be overheat.

The synchronous-control stop determiner 122 is configured to determine that at least one of the first to fifth conditions for determination of stop of synchronous control is met if at least one of the outputs of the off-timing fault determiner 121, the $V_B$ variation determiner 214, the load dump determiner 211, and the overheat protector 223 is the high level. Then, the synchronous-control stop determiner 122 sends an instruction to stop synchronous control to each of the synchronous-control start determiner 102, the high-side MOS on-timing determiner 103, the low-side MOS on-timing determiner 104, the high-side MOS off-timing determiner 107, and the low-side MOS off-timing determiner 109.

As described above, the power generator 1 according to this embodiment is configured to detect that a corresponding phase voltage reaches a corresponding preset threshold (V10 or V11) immediately after the off-timing of each of the MOS transistors 50 and 51, in other words, detect that a time interval from the off timing of each of the MOS transistors 50 and 51 to the arrival of a corresponding phase voltage to a preset threshold voltage is shorter than a preset time interval. This detection allows detection of the delay of the off timing of each of the MOS transistors 50 and 51 relative to the end timing of a corresponding conductive period of a corresponding diode 50a/51a, making it possible to reliably detect the occurrence of an off-timing fault of each of the MOS transistors 50 and 51.

In addition, the power generator 1 according to this embodiment is configured to stop the running synchronous control when detecting the occurrence of an off-timing fault of the MOS transistor 50 or 51, thus preventing the occurrence of a surge due to the off-timing fault. The stop of the running synchronous control allows next synchronous control to be started again at normal timing.

The power generator 1 according to this embodiment is further configured to share the first threshold V10 for both determination of the next on timing of the MOS transistor and determination of off-timing faults of the MOS transistor 51, and share the third threshold voltage V11 for both determination of the next on timing of the MOS transistor 51 and determination of off-timing faults of the MOS transistor 50. This shares the structure of comparing a corresponding phase voltage with each of the first and second thresholds V10 and V11, that is, the high-side and low-side MOS $V_{DS}$ detectors 120 and 130, making it possible to simplify the structure of the power generator 1 and the power generating operations thereof.

The power generator 1 according to this embodiment is configured to set each of the first and second time intervals for detecting off-timing faults of a corresponding MOS transistor 50/51 according to at least one of: time interval from the time of turnoff instruction to a corresponding MOS transistor 50/51 to the time of the corresponding MOS transistor 50/51 to be actually turning off; and the turnoff performance of a corresponding driver 170/172. This configuration makes it possible to detect off-time faults of each of the MOS transistors 50 and 51 based on a corresponding first or second time interval properly determined based on the turnoff performance of a corresponding driver 170/172. Because time taken from turnoff instruction to each of the MOS transistors 50 and 51 to the occurrence of a surge mainly depends on the turnoff performance of a corresponding driver 170/172, setting each of the first and second time intervals for detecting off-timing faults of a corresponding MOS transistor 50/51 independently of the rotational speed of the rotor 4M allows proper detection of off-timing faults of each of the MOS transistors 50 and 51 independently of the rotational speed of the rotor 4M. Using a constant value as each of the first and second time intervals makes it possible to simplify the circuit structure of determining whether there is an off-timing fault of each of the MOS transistors 50 and 51.

If variation in the output voltage $V_B$ is high, such as the rate of variability in the output voltage $V_B$ per preset time is higher than the threshold, such as 0.5 V per 200 µs, the power generator 1 according this embodiment is configured to stop the running synchronous control because it is difficult to properly set on-off timings of each of the MOS transistors 50 and 51, especially off timings thereof. This configuration prevents improper setting of on-off timings of each of the MOS transistors 50 and 51.

The present disclosure is not limited to the aforementioned embodiment, and can be modified within the scope of the present disclosure.

In the aforementioned embodiment, the first and third thresholds V10 and V11 are shared for determination of on timings of the MOS transistors 50 and 51 and for determination of off-timing faults thereof, but the present disclosure is not limited thereto. Specifically, the second and fourth thresholds V20 and V21, which are used for determination of the end timings of the upper-arm and lower-arm on periods (see FIG. 8), can be used for determination of off-timing faults of the MOS transistors 50 and 51.

In this modification, the off-timing fault determiner 121 is configured to detect an off-timing fault of the high-side MOS transistor 50 when the time interval from the time of the turnoff timing of the high-side MOS transistor 50 to the end timing of the upper-arm on period of the same high-side MOS transistor 50 is shorter than a preset time interval due to, for example, the delay of the turnoff timing of the high-side MOS transistor 50; the eng timing of the upper-al Hi on period of the same high-side MOS transistor 50 is a point of time when the output of the high-side MOS $V_{DS}$ detector 120 is changed from the high level to the low level.

Similarly, the off-timing fault determiner 121 is configured to detect an off-timing fault of the low-side MOS transistor 51 when the time interval from the time of the turnoff timing of the low-side MOS transistor 51 to the end timing of the lower-arm on period of the same low-side MOS transistor 51 is shorter than a preset time interval due to, for example, the delay of the turnoff timing of the low-side MOS transistor 51; the eng timing of the lower-arm on period of the same low-side MOS transistor 51 is a point of time when the output of the low-side MOS $V_{DS}$ detector 130 is changed from the high level to the low level. Using the second and fourth thresholds for determination of off-timing faults of the MOS transistors 50 and 51 allows an off-timing fault of each of the MOS transistors 50 and 51 to be reliably detected even before the occurrence of a surge due to the off-timing fault or even if a surge due to the off-timing fault is small in level.

The power generator 1 according to this embodiment is provided with two sets of first and second stator windings 2 and 3, and with corresponding two sets of rectifier modules 5 and 6, but the present disclosure is not limited thereto. Specifically, the power generator 1 according to this embodiment can be provided with the first stator windings 2 and the rectifier modules 5 therefor.

The power generator 1 according to this embodiment serves as a power generator to rectify three-phase AC voltages, but the present disclosure is not limited thereto. Specifically, the power generator 1 can be configured to change on and off timings of each of the MOS transistors 50 and 51 to serve as a rotary electric machine (motor) that inverts a DC voltage supplied from the battery 9 into three-phase AC voltages, and that applies the three-phase AC voltages to one set of three-phase stator windings, thus turning the rotor 4M based on a rotating magnetic field induced in the one set of three-phase stator windings according to the three-phase AV voltages.

In the power generator 1 according to this embodiment, three rectifier modules for one set of stator windings are provided, but an alternative number of rectifier modules for one set of stator windings can be provided. In the power generator 1 according to this embodiment, a MOS transistor is provided as each of high-side (upper arm) and low-side (lower arm) switching elements, but a diode can be provided as high-side rectifying element, and a MOS transistor or another type power transistor can be provided as low-side rectifying elements.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A rotary electric machine with a rotatable rotor, the rotary electric machine comprising:
    at least two three-phase stator windings;
    each of the at least two three-phase stator windings having an associated bridge circuit, each bridge circuit including a rectifier module for each of the three phases, each rectifier module comprising:
        a pair of a high-side switching element and a low-side switching element connected to each other in series, the high-side switching element and the low-side switching element being connected to a corresponding phase winding of the at least two three-phase stator windings;
        a diode parally connected to the high-side switching element and a diode parally connected to the low-side switching element, the rectifier circuit being configured to rectify a phase voltage induced in a corresponding phase winding of each of the at least two three-phase stator windings;
        a high-side on-timing determiner configured to set on-timings of the high-side switching element and a low-side on-timing determiner configured to set on-timings of the low-side switching element;
        a high-side off-timing determiner configured to set off-timings of the high-side switching element and a low-side off-timing determiner configured to set off-timings of the low-side switching element;
        a high-side switching element driver configured to drive the high-side switching element and a low-side switching element driver configured to drive the low-side switching element according to the on-timings and off-timings of a corresponding one of the high-side switching element and the low-side switching element as instructed, respectively by the respective high-side on-timing and off-timing determiners and the low-side on-timing and off-timing determiners; and
        an off-timing fault determiner configured to determine a fault of an off-timing of one of the high-side switching element and the low-side switching element set by the high-side and low-side off-timing determiners when a time interval is shorter than a preset value,
    wherein one of the high-side switching element and the low-side switching element is defined as a target switching element, the target switching element having an associated target off-timing determiner, the target off-timing determiner being one of the high-side and low-side off-timing determiners and
    wherein the time interval is defined as a time interval from when the off-timing of the target switching element is set by the target off-timing determiner to when a phase voltage of the target switching element reaches a threshold after an occurrence of the off-timing.

2. The rotary electric machine according to claim 1, wherein the high-side on-timing determiner and the low-side on-timing determiner are configured to set an on-timing of the high-side switching element and the low-side switching element, respectively, every time the phase voltage reaches a first threshold value, and the high-side off-timing determiner and the low-side off-timing determiner are configured to:
    use the first threshold value as the threshold; and
    determine a fault of the off-timing of the target switching element when a first time interval is shorter than a first preset value,
    the first time interval being taken from the off-timing of the target switching element set by the high-side off-timing determiner and the low-side off-timing determiner to time when the phase voltage reaches the first threshold value,
    the first preset value being used as the preset value, and
    the first threshold value being used to set the on-timing of the high-side switching element or the low-side switching element that is not defined as the target switching element.

3. The rotary electric machine according to claim 1, wherein:
    the high-side on-timing determiner and the low-side on-timing determiner are configured to set an on-timing of the high-side switching element and the low-side switching element, respectively, every time the phase voltage reaches a first threshold value,
    a time period from an arrival of the phase voltage to the first threshold value to an arrival of the phase voltage to a second threshold value is defined as a conductive period of the target switching element, and
    the high-side off-timing determiner and the low-side off-timing determiner are configured to:
    use the second threshold value as the threshold, and
    determine a fault of the off-timing of the target switching element when a second time interval is shorter than a second preset value,
    the second time interval being taken from the off-timing of the target switching element set by the high-side off-timing determiner and the low-side off-timing determiner to time when the phase voltage reaches the second threshold value,
    the second preset value being used as the preset value, and
    the second threshold value being used to detect an end timing of the conductive period of the target switching element.

4. The rotary electric machine according to claim 1, wherein the high-side and low-side on-timing determiners and the high-side and low-side off-timing determiners are configured to carry out a synchronous rectification of the phase voltage induced in each of the at least two three-phase stator windings according to the on-timings and off-timings set by the respective high-side and low-side on-timing determiners and the high-side and low-side off-timing determiners, the rotary electric machine further comprising:

a synchronous control stopper configured to control the high-side and low-side on-timing determiners and the high-side and low-side off-timing determiners to stop the synchronous rectification of the phase voltage induced in each of the at least two three-phase stator windings when the high-side and low-side off-timing determiners determine a fault of the off-timing of the target switching element.

5. The rotary electric machine according to claim 4, wherein the preset value is determined according to a time from an instruction of the off timing set by the high-side and low-side off-timing determiners to the high-side and low-side switching element drivers to a time of actual turn off of the target switching element by the high-side and low-side switching element drivers.

6. The rotary electric machine according to claim 4, wherein the preset value is determined according to a turn-off performance of the high-side and low-side switching element drivers to actually turn off the target switching element.

7. The rotary electric machine according to claim 4, wherein the preset value is determined to contain a point of time when a surge occurs due to a non-conductive state of the diode parally connected to the target switching element after actual turnoff of the target switching element.

8. The rotary electric machine according to claim 4, wherein the preset value is a constant value independent of a rotational speed of the rotatable rotor.

9. The rotary electric machine according to claim 4, wherein the synchronous control stopper is configured to control the high-side and low-side on-timing determiners and the high-side and low-side off-timing determiners to stop the synchronous rectification of the phase voltage induced in each of the at least two three-phase stator windings when a rate of variability of an output voltage of the bridge circuits per preset time is higher than a second preset value.

10. The rotary electric machine according to claim 4, the rotary machine further comprising:

a load-dump protector configured to:
monitor an output voltage at an output terminal of the bridge circuits, the output terminal being connected to a battery; and
when the output voltage exceeds a reference voltage that serves as a reference of occurrence of a surge due to load dump, turn on the low-side switching element for at least one of the at least two three-phase stator windings to perform protection of the rotary electric machine against the load dump, wherein the synchronous control stopper is configured to control the high-side and low-side on-timing determiners and the high-side and low-side off-timing determiners to stop the synchronous rectification of the phase voltage induced in each of the at least two three-phase stator windings when the protection by the load-dump protector is started.

11. The rotary electric machine according to claim 4, the rotary machine further comprising:

an overheat detector configured to detect overheating in at least one of the high-side switching element and the low-side switching element, wherein the synchronous control stopper is configured to control the high-side and low-side on-timing determiners and the high-side and low-side off-timing determiners to stop the synchronous rectification of the phase voltage induced in each of the at least two three-phase stator windings when the overheating in the at least one of the high-side switching element and the low-side switching element is detected by the overheat detector.

12. The rotary electric machine according to claim 1, wherein the at least two three-phase stator windings are each three-phase windings.

* * * * *